(12) United States Patent
Nakagawa et al.

(10) Patent No.: US 7,731,862 B2
(45) Date of Patent: Jun. 8, 2010

(54) DRY ETCHING METHOD, FINE STRUCTURE FORMATION METHOD, MOLD AND MOLD FABRICATION METHOD

(75) Inventors: Hideo Nakagawa, Shiga (JP); Masaru Sasago, Osaka (JP); Tomoyasu Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 609 days.

(21) Appl. No.: 11/475,190

(22) Filed: Jun. 27, 2006

(65) Prior Publication Data

US 2007/0187362 A1    Aug. 16, 2007

(30) Foreign Application Priority Data

Feb. 13, 2006   (JP)   .............. 2006-034854

(51) Int. Cl.
- *B44C 1/22* (2006.01)
- *C03C 15/00* (2006.01)
- *C03C 25/68* (2006.01)
- *C23F 1/00* (2006.01)

(52) U.S. Cl. .............. 216/58; 216/67; 216/81
(58) Field of Classification Search ............ 216/58, 216/67, 81
See application file for complete search history.

(56) References Cited

U.S. PATENT DOCUMENTS

| | | | |
|---|---|---|---|
| 5,298,112 A | 3/1994 | Hayasaka et al. | |
| 5,772,905 A | 6/1998 | Chou | |
| 5,814,238 A | 9/1998 | Ashby et al. | |
| 6,015,976 A | 1/2000 | Hatakeyama et al. | |
| 6,420,095 B1 | 7/2002 | Kawamura et al. | |
| 7,309,446 B1* | 12/2007 | Kley | 216/11 |
| 2003/0024902 A1 | 2/2003 | Li et al. | |
| 2003/0038106 A1* | 2/2003 | Covington et al. | 216/2 |
| 2004/0224504 A1 | 11/2004 | Gadgil | |
| 2005/0112901 A1* | 5/2005 | Ji et al. | 438/710 |

FOREIGN PATENT DOCUMENTS

| | | |
|---|---|---|
| JP | 01-098229 | 4/1989 |
| JP | 07-218739 | 8/1995 |
| JP | 3152831 | 1/2001 |

OTHER PUBLICATIONS

Chou, et al. "Imprint of sub-25 nm vias and trenched in polymers" Appl. Phys. Lett. Nov. 20, 1995, vol. 67, No. 21, pp. 3114-3116.
United States Office Action issued in U.S. Appl. No. 11/659,109, mailed Dec. 31, 2009.
United States Office Action issued in U.S. Appl. No. 11/659,107, mailed Dec. 31, 2009.
United States Office Action issued in U.S. Appl. No. 11/475,173, mailed Jan. 7, 2010.
United States Office Action issued in U.S. Appl. No. 11/475,173, mailed on Nov. 27, 2009.
United States Office Action issued in U.S. Appl. No. 11/475,173, mailed on Dec. 29, 2009.

* cited by examiner

*Primary Examiner*—Shamim Ahmed
*Assistant Examiner*—Mahmoud Dahimene
(74) *Attorney, Agent, or Firm*—McDermott Will & Emery LLP

(57) ABSTRACT

A substance including tungsten and carbon is etched by using plasma. The plasma is generated from a mixed gas of a gas including a fluorine atom, a gas including a nitrogen atom and a gas including a hydrocarbon molecule.

27 Claims, 7 Drawing Sheets

DRY ETCHING METHOD, FINE STRUCTURE FORMATION METHOD, MOLD AND MOLD FABRICATION METHOD

BACKGROUND OF THE INVENTION

The present invention relates to a microprocessing technique for a substance including tungsten (W) and carbon (C), a mold including, as composing elements, a substance including tungsten (W) and carbon (C) and a method for fabricating the mold.

Recently, in accordance with the spread of internet, there are increasing demands for an optical communication system as high bit rate communication infrastructure. In order to introduce the high bit rate communication system into general homes and make it more popular, a technique to realize a low cost of an optical circuit component included in the optical communication system is necessary.

An optical waveguide, that is, a principal composing element of the optical circuit component, can be generally fabricated by forming a desired groove pattern on a glass substrate by a lithography technique and a dry etching technique typified by semiconductor process. Since an expensive fabrication apparatus is necessary in this method, however, it is disadvantageously difficult to reduce the cost of the optical waveguide. Therefore, as described in Patent Document 1, attention is now being paid to a method for forming a desired optical waveguide or the like on a glass by pressing a mold having a desired concavo-convex structure against the surface of a softened material of glass. In this method, a desired optical waveguide can be mass produced when a mold is prepared, and hence, the optical circuit component can be inexpensively provided. However, since this method should be performed at a high temperature and a high pressure, the mold needs to have heat resistance, rigidity and durability. A material satisfying this necessity is a WC alloy including tungsten (W) and carbon (C), that is, hard metals, as principal components.

A method for forming a fine pattern on the surface of a WC alloy is a metal machining method using a diamond cutting tool disclosed in Patent Document 1, but the dimension of a concavo-convex pattern cut on a mold by this machining method is several microns or more and this machining method is also restricted in processing uniformity. As a method for realizing processing of a concavo-convex pattern not only in the dimension range realized by the metal machining method using a diamond cutting tool but also with a concavo-convex dimension of 1 μm or less, a microprocessing technique employing the lithography technique and the dry etching technique is effective. Not only fine concavo-convex pattern can be formed in this method but also processing variation is small and a mold can be fabricated at a lower cost than in the metal machining method using a diamond cutting tool.

As a dry etching technique for a WC alloy, Patent Document 2 discloses that the WC alloy can be dry etched by using $CF_4$ or $SF_6$.

Now, the conventional dry etching method will be described with reference to FIGS. 6A and 6B. As shown in FIG. 6A, a reaction chamber 101 in which a reduced pressure can be kept is provided with a gas inlet 102 and a gas outlet 103. Also, a plasma generator 104 for changing a gas supplied through the gas inlet 102 into plasma is provided in an upper portion of the reaction chamber 101. Furthermore, an electrode 106 on which a target material, specifically, a WC alloy substrate or a substrate having a WC alloy in its surface portion (hereinafter both referred to as a WC substrate 107), is placed is provided on an insulator 105 in a lower portion of the reaction chamber 101. An RF (radio frequency) power source 108 for applying a bias voltage to the electrode 106 is provided outside the reaction chamber 101.

Next, the operation of the etching system shown in FIG. 6A will be described by exemplifying the case where $CF_4$ is used as an etching gas. As shown in FIG. 6A, $CF_4$ is introduced through the gas inlet 102 into the reaction chamber 101, and plasma 150 of the $CF_4$ is generated by the plasma generator 104 and at the same time, RF bias is applied to the WC substrate 107 by the RF power source 108. As a result, radicals 109 of C, F or $CF_n$ (wherein n=1 through 4) and their ions 110 are produced in the plasma 150. At this point, in the plasma 150 used for the dry etching, the proportions in the number of atoms or molecules produced by the plasma 150 are generally in the order of $F>CF_n>>C$. The radicals 109 are isotropically diffused to reach the WC substrate 107, but the ions 110 are accelerated between the plasma 150 and the WC substrate 107 and hence enter the WC substrate 107 substantially vertically. In particular, in the case where a $F^+$ ion or a $CF^{n+}$ ion including a F atom enters the WC substrate 107, a bond between W and C is cut and W is released in the form of $WF_x$ (wherein x=1 through 6). On the other hand, C is re-released in the form of $CF_y$ (wherein y=1 through 4).

The etching reaction caused on the surface of the WC substrate will now be described in more detail with reference to FIG. 6B. As shown in FIG. 6B, a resist pattern 112 is formed on a WC substrate 111. When the WC substrate 111 is etched with ions 113a and 113b of $F^+$ or $CF^+$ by using the resist pattern 112 as a mask, the W included in the WC substrate 111 is released in the form of $WF_x$ (wherein x=1 through 6) 114. At this point, the side face of a pattern of the WC substrate 111 obtained through the etching is in a bowing shape for the following reason:

In the etching of the WC substrate 111, most ions enter the WC substrate 111 substantially vertically like the ion 113a, but since ions basically have energy spread (an ion energy angular distribution), some ions enter the WC substrate 111 obliquely like the ion 113b. Accordingly, the anisotropic (vertical) etching of the WC substrate 111 by using the resist pattern 112 as the etching mask is realized by the ion 113a vertically entering the WC substrate 111. However, due to the impact caused by the ion 113b obliquely entering the WC substrate 111, the side face of the pattern of the WC substrate 111 is etched, resulting in the bowing shape as shown in FIG. 6B.

Next, a conventional fine structure formation method for a WC alloy and a mold fabrication method by employing the same will be described with reference to FIGS. 7A through 7D.

As shown in FIG. 7A, a WC alloy substrate 121 is prepared, and a resist pattern 122 is formed on the WC alloy substrate 121 as shown in FIG. 7B. The resist pattern 122 is generally formed by the lithography technique. Next, as shown in FIG. 7C, a pattern is transferred onto the WC alloy substrate 121 by using the resist pattern 122 as a mask. At this point, the pattern transfer is performed by the dry etching technique.

When the aforementioned conventional dry etching technique is employed, since ions 123 entering the WC alloy substrate 121 from plasma have the energy spread, there are not only a component A vertically entering the surface of the WC alloy substrate 121 but also components obliquely entering the surface at an angle, namely, obliquely entering components B and C. Therefore, since the side face of a pattern of the WC alloy substrate 121 is etched by such obliquely entering ions, the etched cross-section is in what is called a bowing shape as shown in FIG. 7C.

Then, the resist pattern 122 is removed through ashing, and the resultant substrate is cleaned. Thus, a mold made of the WC alloy substrate 121 having a fine concavo-convex structure in its surface and inside portions is obtained as shown in FIG. 7D.

A conventional processing technique by using a mold is a nano-imprint method such as nano-imprint lithography proposed by S. Y. Chou et al. (see, for example, Patent Document 3 and Non-patent Document 1). In the nano-imprint method, a mold is pressed against a resist thin film formed on a semiconductor wafer for forming a fine resist pattern, and this method is currently under development for forming a fine pattern of a nano order as the minimum dimension. In a fine structure portion of a conventional mold for use in the nano-imprint method, a $Sio_2$ film or a $Si_3N_4$ film that can be easily processed is used.

Patent Document 1: Japanese Patent No. 3152831
Patent Document 2: Japanese Laid-Open Patent Publication No. 1-98229
Patent Document 3: U.S. Pat. No. 5,772,905
Non-patent Document 1: Stephen Y. Chou, et al., Appl. Phys. Lett., Vol. 67, 1995, pp. 3114-3116

SUMMARY OF THE INVENTION

In the conventional dry etching method using $CF_4$ or $SF_6$, however, not only the bottom of a pattern but also the side face of the pattern is etched so that the side face is formed in a bowing shape as described above, and hence, a vertical etching shape cannot be attained and high performance processing cannot be performed. Furthermore, the processing by the conventional dry etching method has a problem that a highly precise fine structure cannot be formed on and inside a WC alloy. As a result, there is a serious problem that a WC alloy mold with a highly precise fine structure cannot be fabricated.

In consideration of the aforementioned conventional disadvantage and problem, an object of the invention is providing a dry etching method for a WC alloy that can realize a vertical etching shape by preventing the side face of a pattern from being etched. Another object of the invention is providing a fine structure formation method for forming a highly precise fine structure in a vertical shape on and inside a WC alloy. Still another object of the invention is providing a WC alloy mold with a highly precise fine structure and a method for fabricating the same.

In order to achieve the objects, the dry etching method of this invention includes the step of performing dry etching on a substance including tungsten and carbon by using plasma generated from a mixed gas of a gas including a fluorine atom, a gas including a nitrogen atom and a gas including a hydrocarbon molecule.

In the dry etching method of this invention, since an ion including a fluorine atom, an ion including a nitrogen atom and a hydrocarbon molecule are produced by the plasma, it is possible to perform etching processing for realizing, on and within the substance including tungsten and carbon, a highly precise vertical shape or a highly precise downward tapered shape free from a bowing shape. Examples of the substance including tungsten and carbon are a WC alloy and a substance including W and C as principal components (in which a total composition ratio of W and C is 50 at % or more).

In the dry etching method of this invention, the gas including a fluorine atom and the gas including a nitrogen atom may be replaced with a gas including a fluorine atom and a nitrogen atom ($NF_3$, $N_2F$ or the like). Also, the gas including a fluorine atom and the gas including a hydrocarbon molecule may be replaced with a gas including a fluorine atom and a hydrocarbon molecule. Specifically, a gas of, for example, HFE-227 me ($CF_3OCHFCF_3$), tetrafluorooxetane ($CF_2CF_2OCH_2$), hexafluoroisopropanol (($CF_3)_2CHOH$), HFE-245 mf ($CF_2CH_2OCHF_2$), HFE-347 mcf ($CHF_2OCH_2CF_2CF_3$), HFE-245 mc ($CHF_3OCF_2CF_3$), HFE-347 mf-c ($CF_3CH_2OCF_2CF_2H$), HFE-236 me ($CHF_2OCH_2CHFCF_3$) or the like may be used. It is noted that these gases are gases with a small warming coefficient for use against the global warming and are friendly to the environment.

In the dry etching method of the invention, the gas including a fluorine atom preferably includes a fluorine molecule, fluorocarbon, fluorohydrocarbon or a mixture of two or more thereof. Thus, the ion including a fluorine atom (such as a fluorine atom ion, a fluorine molecule ion, a fluorocarbon ion, a fluorohydrocarbon ion or the like) necessary for etching the tungsten (W) included in the substance including W and C can be efficiently produced through plasma discharge.

In the dry etching method of the invention, the gas including a nitrogen atom preferably includes a nitrogen molecule, an ammonia molecule or a mixture thereof. Thus, the ion including a nitrogen ion (such as a nitrogen atom ion, a nitrogen molecule ion, a hydrogenated nitrogen molecule ion or the like) can be efficiently produced through the plasma discharge, and hence, the carbon (C) included in the substance including W and C can be efficiently removed through etching.

In the dry etching method of the invention, the hydrocarbon molecule is preferably a saturated hydrocarbon molecule. Thus, since the saturated hydrocarbon molecule does not include a double bond, it can be easily decomposed through the plasma discharge, and $CH_r$ (wherein r=1 through 3) can be efficiently produced as a decomposition product. Accordingly, a protecting film for a pattern side face can be efficiently formed from the $CH_r$ during the etching.

In the dry etching method of the invention, the mixed gas preferably further includes a hydrogen molecule or an ammonia molecule. Thus, the amount of hydrogen (specifically, a hydrogen atom, a hydrogen molecule, a hydrogen atom ion and a hydrogen molecule ion) produced through the plasma discharge is increased, and hence, the etching efficiency for the carbon (C) included in the substance including W and C can be increased.

In the dry etching method of the invention, wherein the mixed gas preferably further includes a gas including an oxygen atom. Thus, oxygen (specifically, an oxygen atom, an oxygen molecule, an oxygen atom ion and an oxygen molecule ion) excited by the plasma discharge can be efficiently produced, and hence, the carbon (C) included in the substance including W and C and a deposition such as an excessive portion of a sidewall protecting film can be appropriately removed, and the etching rate for the substance can be increased.

In the dry etching method of the invention, the mixed gas preferably further includes an inert gas. Thus, the plasma discharge can be stabilized by an inert gas effect, and hence, what is called a process window (i.e., an applicable process condition range) can be easily increased.

In the dry etching method of the invention, the mixed gas preferably further includes at least one of a gas including a chlorine atom, a gas including a bromine atom and a gas including an iodine atom. Thus, since tungsten chloride, tungsten bromide or tungsten iodide produced by etching the substance including W and C with a chlorine ion, a bromine ion or an iodine ion produced from the plasma is adsorbed again onto the side face of an etched portion, the effect to protect the side face is increased, resulting in easily realizing etching in a downward tapered shape.

The fine structure formation method of this invention includes the steps of forming a mask pattern on a substance including tungsten and carbon; and performing, with the mask pattern used, dry etching on the substance by using plasma generated from a mixed gas of a gas including a fluorine atom, a gas including a nitrogen atom and a gas including a hydrocarbon molecule.

In the fine structure formation method of this invention, since an ion including a fluorine atom, an ion including a nitrogen atom and a hydrocarbon molecule are produced by the plasma, it is possible to perform etching processing for realizing, on and within the substance including tungsten and carbon, a highly precise vertical shape or a highly precise downward tapered shape free from a bowing shape.

In the fine structure formation method of this invention, the gas including a fluorine atom and the gas including a nitrogen atom may be replaced with a gas including a fluorine atom and a nitrogen atom ($NF_3$, $N_2F$ or the like). Also, the gas including a fluorine atom and the gas including a hydrocarbon molecule may be replaced with a gas including a fluorine atom and a hydrocarbon molecule. Specifically, a gas of, for example, HFE-227 me ($CF_3OCHFCF_3$), tetrafluorooxetane ($CF_2CF_2OCH_2$), hexafluoroisopropanol (($CF_3$)$_2$CHOH), HFE-245 mf ($CF_2CH_2OCHF_2$), HFE-347 mcf ($CHF_2OCH_2CF_2CF_3$), HFE-245 mc ($CHF_3OCF_2CF_3$), HFE-347 mf-c ($CF_3CH_2OCF_2CF_2H$), HFE-236 me ($CHF_2OCH_2CHFCF_3$) or the like may be used. It is noted that these gases are gases with a small warming coefficient for use against the global warming and are friendly to the environment.

In the fine structure formation method of the invention, the gas including a fluorine atom preferably includes a fluorine molecule, fluorocarbon, fluorohydrocarbon or a mixture of two or more thereof. Thus, the ion including a fluorine atom (such as a fluorine atom ion, a fluorine molecule ion, a fluorocarbon ion, a fluorohydrocarbon ion or the like) necessary for etching the tungsten (W) included in the substance including W and C can be efficiently produced through plasma discharge. As a result, microprocessing by the dry etching can be performed.

In the fine structure formation method of the invention, the gas including a nitrogen atom preferably includes a nitrogen molecule, an ammonia molecule or a mixture thereof. Thus, the ion including a nitrogen ion (such as a nitrogen atom ion, a nitrogen molecule ion, a hydrogenated nitrogen molecule ion or the like) can be efficiently produced through the plasma discharge, and hence, the carbon (C) included in the substance including W and C can be efficiently removed through etching. As a result, rapid microprocessing can be realized.

In the fine structure formation method of the invention, the hydrocarbon molecule is preferably a saturated hydrocarbon molecule. Thus, since a protecting film for a pattern side face is efficiently formed from $CH_r$ (wherein r=1 through 3) produced from the plasma during the etching, microprocessing for attaining a vertical shape or a downward tapered shape can be definitely realized.

In the fine structure formation method of the invention, the mixed gas preferably further includes a hydrogen molecule or an ammonia molecule. Thus, the amount of hydrogen (specifically, a hydrogen atom, a hydrogen molecule, a hydrogen atom ion and a hydrogen molecule ion) produced through the plasma discharge is increased, and hence, the etching efficiency for the carbon (C) included in the substance including W and C can be increased. As a result, further rapid microprocessing can be realized.

In the fine structure formation method of the invention, wherein the mixed gas preferably further includes a gas including an oxygen atom. Thus, oxygen (specifically, an oxygen atom, an oxygen molecule, an oxygen atom ion and an oxygen molecule ion) excited by the plasma discharge can be efficiently produced, and hence, the carbon (C) included in the substance including W and C and a deposition such as an excessive portion of a sidewall protecting film can be appropriately removed, and the etching rate for the substance can be increased. Accordingly, further rapid microprocessing can be realized.

In the fine structure formation method of the invention, the mixed gas preferably further includes an inert gas. Thus, the plasma discharge can be stabilized by an inert gas effect, and hence, what is called a process window can be easily increased.

In the fine structure formation method of the invention, the mixed gas preferably further includes at least one of a gas including a chlorine atom, a gas including a bromine atom and a gas including an iodine atom. Thus, the effect to protect the side face by chlorine, bromine or iodine is increased, resulting in easily realizing microprocessing in a downward tapered shape.

The mold fabrication method of this invention includes the step of processing a substance including tungsten and carbon into a mold by using plasma generated from a mixed gas of a gas including a fluorine atom, a gas including a nitrogen atom and a gas including a hydrocarbon molecule.

In the mold fabrication method of this invention, a mold is fabricated by employing the dry etching method of this invention, and therefore, a mold made of a substance including tungsten and carbon and having a fine concavo-convex pattern with a vertical cross-section or a downward tapered cross-section can be fabricated.

In the mold fabrication method of this invention, the gas including a fluorine atom and the gas including a nitrogen atom may be replaced with a gas including a fluorine atom and a nitrogen atom ($NF_3$, $N_2F$ or the like). Also, the gas including a fluorine atom and the gas including a hydrocarbon molecule may be replaced with a gas including a fluorine atom and a hydrocarbon molecule. Specifically, a gas of, for example, HFE-227 me ($CF_3OCHFCF_3$), tetrafluorooxetane ($CF_2CF_2OCH_2$), hexafluoroisopropanol (($CF_3$)$_2$CHOH), HFE-245 mf ($CF_2CH_2OCHF_2$), HFE-347 mcf ($CHF_2OCH_2CF_2CF_3$), HFE-245 mc ($CHF_3OCF_2CF_3$), HFE-347 mf-c ($CF_3CH_2OCF_2CF_2H$), HFE-236 me ($CHF_2OCH_2CHFCF_3$) or the like may be used. It is noted that these gases are gases with a small warming coefficient for use against the global warming and are friendly to the environment.

In the mold fabrication method of the invention, the gas including a fluorine atom preferably includes a fluorine molecule, fluorocarbon, fluorohydrocarbon or a mixture of two or more thereof. Thus, the ion including a fluorine atom (such as a fluorine atom ion, a fluorine molecule ion, a fluorocarbon ion, a fluorohydrocarbon ion or the like) necessary for etching the tungsten (W) included in the substance including W and C can be efficiently produced through the plasma discharge. As a result, a mold having a fine concavo-convex pattern can be precisely and more inexpensively fabricated.

In the mold fabrication method of the invention, the gas including a nitrogen atom preferably includes a nitrogen molecule, an ammonia molecule or a mixture thereof. Thus, the ion including a nitrogen ion (such as a nitrogen atom ion, a nitrogen molecule ion, a hydrogenated nitrogen molecule ion or the like) can be efficiently produced through the plasma discharge, and hence, the carbon (C) included in the substance including W and C can be efficiently removed through etching. As a result, a mold having a fine concavo-convex pattern with a vertical cross-section or a downward tapered cross-section can be rapidly fabricated.

In the mold fabrication method of the invention, the hydrocarbon molecule is preferably a saturated hydrocarbon molecule. Thus, since a protecting film for a pattern side face can be efficiently formed from $CH_r$ (r=1 through 3) produced from the plasma, a mold having a fine concavo-convex pattern with a vertical cross-section or a downward tapered cross-section can be definitely fabricated.

In the mold fabrication method of the invention, the mixed gas preferably further includes a hydrogen molecule or an ammonia molecule. Thus, the etching rate for the carbon (C) included in the substance including W and C can be increased by hydrogen (specifically, a hydrogen atom, a hydrogen molecule, a hydrogen atom ion and a hydrogen molecule ion) produced from the plasma, and hence, a mold having a fine concavo-convex pattern with a vertical cross-section or a downward tapered cross-section can be more rapidly fabricated.

In the mold fabrication method of the invention, wherein the mixed gas preferably further includes a gas including an oxygen atom. Thus, the carbon (C) included in the substance including W and C and a deposition such as an excessive portion of a sidewall protecting film can be appropriately removed by oxygen (specifically, an oxygen atom, an oxygen molecule, an oxygen atom ion and an oxygen molecule ion) produced from the plasma, and the etching rate for the substance can be increased. Accordingly, a mold having a fine concavo-convex pattern with a vertical cross-section or a downward tapered cross-section can be further rapidly fabricated.

In the mold fabrication method of the invention, the mixed gas preferably further includes an inert gas. Thus, the plasma discharge can be stabilized by the inert gas effect, and hence, what is called a process window can be easily increased, and a mold having a fine concavo-convex pattern with a vertical cross-section or a downward tapered cross-section can be stably fabricated.

In the mold fabrication method of the invention, the mixed gas preferably further includes at least one of a gas including a chlorine atom, a gas including a bromine atom and a gas including an iodine atom. Thus, the effect to protect the side face by chlorine, bromine or iodine is increased, and hence, a mold having a fine concavo-convex pattern with downward tapered side faces can be easily fabricated.

The mold of this invention is fabricated by processing a substance including tungsten and carbon by using plasma generated from a mixed gas of a gas including a fluorine atom, a gas including a nitrogen atom and a gas including a hydrocarbon molecule.

Since the mold of this invention is fabricated by employing the dry etching method of this invention, a mold made of a substance including tungsten and carbon and having a fine concavo-convex pattern with a vertical cross-section or a downward tapered cross-section can be rapidly provided.

In the mold of this invention, the gas including a fluorine atom and the gas including a nitrogen atom may be replaced with a gas including a fluorine atom and a nitrogen atom ($NF_3$, $N_2F$ or the like). Also, the gas including a fluorine atom and the gas including a hydrocarbon molecule may be replaced with a gas including a fluorine atom and a hydrocarbon molecule. Specifically, a gas of, for example, HFE-227 me ($CF_3OCHFCF_3$), tetrafluorooxetane ($CF_2CF_2OCH_2$), hexafluoroisopropanol (($CF_3)_2CHOH$), HFE-245 mf ($CF_2CH_2OCHF_2$), HFE-347 mcf ($CHF_2OCH_2CF_2CF_3$), HFE-245 mc ($CHF_3OCF_2CF_3$), HFE-347 mf-c ($CF_3CH_2OCF_2CF_2H$), HFE-236 me ($CHF_2OCH_2CHFCF_3$) or the like may be used. It is noted that these gases are gases with a small warming coefficient for use against the global warming and are friendly to the environment.

In the mold of the invention, the gas including a fluorine atom preferably includes a fluorine molecule, fluorocarbon, fluorohydrocarbon or a mixture of two or more thereof. Thus, the ion including a fluorine atom (such as a fluorine atom ion, a fluorine molecule ion, a fluorocarbon ion, a fluorohydrocarbon ion or the like) necessary for etching the tungsten (W) included in the substance including W and C can be efficiently produced through plasma discharge. As a result, a mold having a fine concavo-convex pattern can be precisely and more inexpensively provided.

In the mold of the invention, the gas including a nitrogen atom preferably includes a nitrogen molecule, an ammonia molecule or a mixture thereof. Thus, the ion including a nitrogen ion (such as a nitrogen atom ion, a nitrogen molecule ion, a hydrogenated nitrogen molecule ion or the like) can be efficiently produced through the plasma discharge, and hence, the carbon (C) included in the substance including W and C can be efficiently removed through etching. As a result, a mold having a fine concavo-convex pattern with a vertical cross-section or a downward tapered cross-section can be rapidly provided.

In the mold of the invention, the hydrocarbon molecule is preferably a saturated hydrocarbon molecule. Thus, since a protecting film for a pattern side face can be efficiently formed from $CH_r$ (r=1 through 3) produced from the plasma, a mold having a fine concavo-convex pattern with a vertical cross-section or a downward tapered cross-section can be provided.

In the mold of the invention, the mixed gas preferably further includes a hydrogen molecule or an ammonia molecule. Thus, the etching rate for the carbon (C) included in the substance including W and C can be increased by hydrogen (specifically, a hydrogen atom, a hydrogen molecule, a hydrogen atom ion and a hydrogen molecule ion) produced from the plasma, and hence, a mold having a fine concavo-convex pattern with a vertical cross-section or a downward tapered cross-section can be more rapidly provided.

In the mold of the invention, wherein the mixed gas preferably further includes a gas including an oxygen atom. Thus, the carbon (C) included in the substance including W and C and a deposition such as an excessive portion of a sidewall protecting film can be appropriately removed by oxygen (specifically, an oxygen atom, an oxygen molecule, an oxygen atom ion and an oxygen molecule ion) produced from the plasma, and the etching rate for the substance can be increased. Accordingly, a mold having a fine concavo-convex pattern with a vertical cross-section or a downward tapered cross-section can be further rapidly provided.

In the mold of the invention, the mixed gas preferably further includes an inert gas. Thus, the plasma discharge can be stabilized by the inert gas effect, and hence, what is called a process window can be easily increased, and a mold having a fine concavo-convex pattern with a vertical cross-section or a downward tapered cross-section can be stably provided.

In the mold of the invention, the mixed gas preferably further includes at least one of a gas including a chlorine atom, a gas including a bromine atom and a gas including an iodine atom. Thus, the effect to protect the side face by chlorine, bromine or iodine is increased, and hence, a mold having a fine concavo-convex pattern with downward tapered side faces can be easily provided.

Since the mold of this invention is fabricated by the dry etching method of this invention, a nitrogen content is higher in a portion closer to a processed face of the substance including tungsten and carbon.

The effects attained by the invention are summarized as follows:

In the dry etching method of this invention, etching is performed by using plasma generated from a mixed gas of a gas including a fluorine atom, a gas including a nitrogen atom and a gas including a hydrocarbon molecule, and therefore, the following effects can be attained: Tungsten is removed through etching in the form of $WF_x$ (wherein x=1 through 6) by an ion including a fluorine atom supplied from the plasma. Simultaneously, a protecting film is formed during the etching on the side face of a pattern by a $CH_r$ (wherein r=1 through 3) radical produced from the hydrocarbon molecule included in the plasma, and hence, an etching reaction caused by impact of an ion entering the side face of the pattern can be prevented. As a result, an etched cross-section in a vertical shape can be realized. On the other hand, since carbon is efficiently removed in the form of CN, $C_2N_2$ or HCN by an ion including a nitrogen atom supplied from the plasma, the etching efficiency for the tungsten by the ion including a fluorine atom can be further improved. As a result, a substance including W and C can be rapidly etched into a vertical or downward tapered shape.

Furthermore, when a gas including a hydrogen atom is further added to the mixed gas of the gas including a fluorine atom, the gas including a nitrogen atom and the gas including a hydrocarbon molecule in the dry etching method of this invention, the following effect can be attained: Since a hydrogen atom, a hydrogen molecule, a hydrogen atom ion and a hydrogen molecule ion are further produced in the plasma of the mixed gas, the supply amount of hydrogen can be increased. Therefore, the carbon included in the substance including tungsten and carbon can be removed in the form of HCN with high volatility. As a result, the etching into a vertical shape can be more rapidly performed.

Moreover, when the mixed gas of the gas including a fluorine atom, the gas including a nitrogen atom and the gas including a hydrocarbon molecule further includes at least one of a gas including a chlorine atom, a gas including a bromine atom and a gas including an iodine atom in the dry etching method of this invention, the following effect can be attained: Since a chlorine atom ion, a bromine atom ion or an iodine atom ion is further produced in the plasma of the mixed gas, $WCl_x$ (wherein x=1 through 6) or $WBr_x$ (wherein x=1 through 6) or $WI_x$ (wherein x=1 through 6) with lower volatility is produced from the etched portion. Therefore, as compared with the case where none of the gas including a chlorine atom, the gas including a bromine atom and the gas including an iodine atom is added, a sidewall protecting film with a larger thickness can be easily formed. Accordingly, not only the etching into a vertical shape but also the etching into a downward tapered shape can be easily realized.

In the fine structure formation method of this invention, a fine concavo-convex pattern with a vertical cross-section or a downward tapered cross-section can be formed on and within a substance including tungsten and carbon.

In the mold fabrication method of this invention, a mold made of a substance including tungsten and carbon and having a fine concavo-convex pattern with a vertical cross-section or a downward tapered cross-section can be fabricated.

In the mold of this invention, a mold made of a substance including tungsten and carbon and having a fine concavo-convex pattern with a vertical cross-section or a downward tapered cross-section can be realized.

In any of the dry etching method, the fine structure formation method, the mold fabrication method and the mold of this invention, when the substance including tungsten and carbon further includes nitrogen (N), the same effects as described above can be attained. In other words, when the invention is applied to a WCN alloy, a WNC alloy or the like, the same effects can be attained.

As described so far, the dry etching method of this invention is useful for highly precisely microprocessing a substance including tungsten and carbon such as a WC alloy. Also, the fine structure formation method of this invention is very useful for precisely forming a fine pattern in a substance including tungsten and carbon such as a WC alloy. Specifically, as a technique to remarkably increase the preciseness and easiness of processing of a hard metal of a WC alloy or the like, the dry etching method and the fine structure formation method of this invention can pave the way for the use of a WC alloy or the like in the field of MEMS (micro-electro-mechanical systems).

The mold fabrication method of this invention is indispensable for fabricating a mold having a highly precise fine concavo-convex pattern by using, as a mold base material, a substance including tungsten and carbon such as a WC alloy. Also, since the mold of this invention has a structure in which a highly precise fine concavo-convex pattern is provided on a hard metal of a WC alloy or the like, it can be used not only for fabrication of an optical circuit component or for nano-imprint but also as a highly durable mold having a highly precise fine concavo-convex pattern applicable in any field.

DETAILED DESCRIPTION OF THE INVENTION

Embodiment 1

A dry etching method according to Embodiment 1 of the invention will now be described with reference to the accompanying drawings.

Figure 1A:
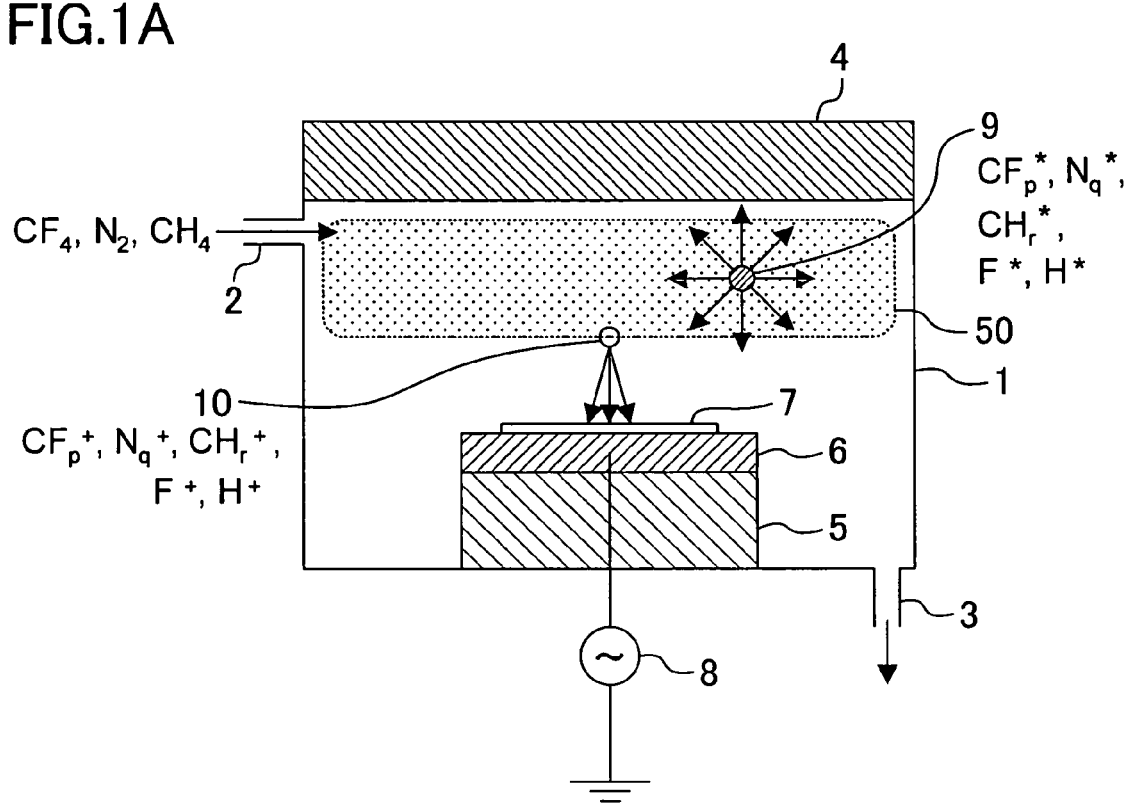
FIGS. 1A and 1B are explanatory diagrams of a dry etching method according to Embodiment 1 of the invention.
Figure 1B:
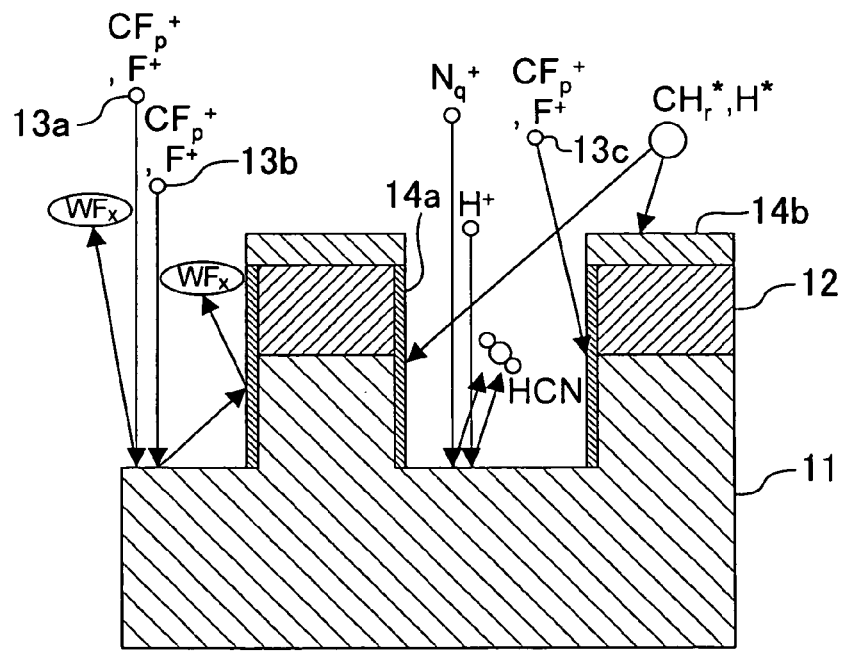

FIGS. 1A and 1B are explanatory diagrams of the dry etching method of Embodiment 1 of the invention. As shown in FIG. 1A, a reaction chamber 1 in which a reduced pressure can be kept is provided with a gas inlet 2 and a gas outlet 3. Also, a plasma generator 4 for changing a gas supplied through the gas inlet 2 into plasma is provided in an upper portion of the reaction chamber 1. Furthermore, an electrode 6 on which a target substance including tungsten and carbon, specifically, a WC alloy substrate or a substrate having a WC alloy in its surface portion (hereinafter both referred to as a WC substrate 7), is placed is provided on an insulator 5 in a lower portion of the reaction chamber 1. An RF (radio frequency) power source 8 for applying a bias voltage to the electrode 6 is provided outside the reaction chamber 1.

Next, the operation of the etching system shown in FIG. 1A, namely, the dry etching method of this embodiment, will be described by exemplifying the case where a mixed gas of a gas including a fluorine atom, a gas including a nitrogen atom and a gas including a hydrocarbon molecule is used as an etching gas. As shown in FIG. 1A, the mixed gas of the gas including a fluorine atom (such as a $CF_4$ gas), the gas including a nitrogen atom (such as a $N_2$ gas) and the gas including a hydrocarbon molecule (such as $CH_4$ gas) is introduced through the gas inlet 2 into the reaction chamber 1, and plasma 50 of the mixed gas is generated by the plasma generator 4 and at the same time, RF bias is applied to the WC substrate 7 by the RF power source 8. As a result, radicals 9 of $CF_p^*$ (wherein p=1, 2 or 3), $N_q^*$ (wherein q=1 or 2), $CH_r^*$ (wherein r=1, 2 or 3), $F^*$ and $H^*$ and ions 10 of $CF_p^+$ (wherein p=1, 2 or 3), $N_q^+$ (wherein q=1 or 2), $CH_r^+$ (wherein r=1, 2 or 3), $F^+$ and $H^+$ are produced in the plasma 50 generated from the mixed gas of the gas including a fluorine atom, the gas including a nitrogen atom and the gas including a hydrocarbon molecule. It is noted that a mark "*" is herein used for expressing a radical including an excited atom.

The radicals 9 are isotropically diffused to reach the WC substrate 7, but the ions 10 are accelerated between the plasma 50 and the WC substrate 7 and hence enter the WC substrate 7 substantially vertically. At this point, $CF_p^+$ and $F^+$ out of the ions 10 cut bonds between W and C by their kinetic energy so as to react with W, resulting in releasing $WF_x$ (wherein x=1 through 6). On the other hand, C is removed through etching by a nitrogen ion ($N_q^+$) and a hydrogen ion ($H^+$) mainly in the form of CN or $C_2N_2$ and is partly re-released in the form of $CF_x$ (wherein x=1 through 4).

The etching reaction caused on the surface of the WC substrate will be described in more detail with reference to FIG. 1B. In particular, FIG. 1B shows an etching mechanism obtained when a substance including W and C is etched by using plasma for producing an ion having a fluorine atom, an ion having a nitrogen atom and a hydrocarbon molecule. As shown in FIG. 1B, after forming a resist pattern 12 on a WC substrate 11, the WC substrate 11 is etched with ions 13a, 13b and 13c of $CF_p^+$ (wherein p=1, 2 or 3) and $F^+$ by using the resist pattern 12 as a mask, and the W included in the WC substrate 11 is released in the form of $WF_x$ (wherein x=1 through 6) made into a sidewall protecting film 14a. It is noted that the sidewall protecting film 14a is made of a mixture of a $WF_x$ compound and a CHFN polymer and covers and protects the side face of a pattern.

Next, the functions of the ions and the radicals will be described.

First, out of $CF_p^+$ (wherein p=1, 2 or 3) and $F^+$, the ion 13a substantially vertically entering the WC substrate 11 cuts a bond between W and C by its ion impact energy, and F is chemically bonded to W so as to produce a reaction product of $WF_x$. At this point, the $WF_x$ reacts with a plurality of incident ions 13a a plurality of times, so as to be ultimately released into the gas phase as a molecule of $WF_5$ or $WF_6$. This is the principal etching mechanism for the W included in the WC substrate 11.

Also, when a $N_q^+$ (wherein q is 1 or 2) and a $H^+$ ion enter the WC substrate 11, they cut bonds between W and C by their ion impact energy, and N and H are chemically bonded to C, resulting in removing through etching the C included in the WC substrate 11 in the form of a reaction product (principally HCN). In this embodiment, a $H^+$ ion is produced as a decomposition product of a hydrocarbon molecule (such as $CH_4$) and hydrogen is supplied onto the etching reaction surface in the form of a $CH_r^*$ (wherein r=1, 2 or 3) radical or a $CH_r^+$ (wherein r=1, 2 or 3) ion, and therefore, the probability of removing carbon in the form of HCN is increased. This is the principal etching mechanism for the C included in the WC substrate 11.

Also when a gas having no H is used, the carbon included in the WC substrate 11 is sufficiently removed through etching in the form of CN and $C_2N_2$, so that the proceeding of the etching can be accelerated. Conversely, when hydrogen is simultaneously present with the nitrogen ion on the etching reaction surface as in this embodiment, the power to remove the C is increased. Furthermore, owing to the impact caused by the $CF_p^+$ (wherein p=1, 2 or 3) ion and the $F^+$ ion, the carbon is partially re-released from the WC substrate 11 in the form of $CF_x$ (wherein x=1 through 4).

In this manner, according to this embodiment, not only the etching mechanism for W but also the mechanism for positively removing C through etching is attained, and therefore, rapid etching processing can be realized.

Furthermore, most of the $CH_r^+$ (wherein r=1, 2 or 3) ions having entered the WC substrate 11 are deposited on the surface of the substrate or within (on the side face and the bottom of) the pattern. This is the principal mechanism for forming the sidewall protecting film in the etching method of this embodiment. However, part of the $CH_r^+$ ions having entered the WC substrate 11 are directly re-released in the form of $CH_r^+$ (wherein r=1, 2 or 3) ions.

On the other hand, although not shown in FIG. 1B, the radicals 9 of FIG. 1A, namely, $CF_p^*$ (wherein p=1, 2 or 3), $N_q^*$ (wherein q=1 or 2), $CH_r^*$ (wherein r=1, 2 or 3), $F^*$ and $H^*$, are isotropically diffused from the plasma gas phase to be transported to the surface of the WC substrate 11. These radicals are basically physically or chemically adsorbed onto the surface of the substrate or on the surface of the pattern, and the adsorbed radicals receive the impact energy of other ions entering the surface of the substrate and cause chemical reactions through what is called an ion assist etching reaction, and then, they are desorbed from the surface of the substrate. Accordingly, under conditions where the etching is proceeded, most of substances adsorbed onto the bottom of the pattern are removed through etching together with a part of the WC substrate 11 through the ion assist etching reaction. However, since the amount of incident ions is smaller on the side face of the pattern than on the bottom of the pattern, the amount of adsorbed radicals is larger than the amount of ions proceeding the etching, and hence, a deposition is produced on the side face of the pattern so as to form the sidewall protecting film 14a. In other words, the principal components of the sidewall protecting film 14a are C, H, F and N, that is, a combination of compositions of the supplied radicals. In forming such a CHFN polymer, the $CH_r^*$ (wherein r=1, 2 or 3) radical plays a very significant role among the various radicals. In particular, since the $CH_r^*$ (wherein r=1, 2 or 3) radical has a small molecular weight, the adsorption coefficient is comparatively small, and therefore, it is transported to the bottom of a recess with a high aspect ratio (the bottom of a high aspect ratio pattern). As a result, the protecting film can be formed on a portion of the side face in the vicinity of the bottom of the high aspect ratio pattern. On the contrary, a hydrocarbon molecule not dissociated and higher-order hydrocarbon $C_yH_z$ (wherein y and z are integers and y is 2 or more) apart form the $CH_r^*$ (wherein r=1, 2 or 3) radical have large adsorption coefficients (sticking coefficients) and hence cannot enter the inside of a fine pattern, and therefore, most of them are deposited on the surface of the substrate. As a result, a surface protecting film 14b is formed so as to protect the resist pattern 12, and hence, the etching resistance of the resist is remarkably improved.

Furthermore, like the ion 13b of $CF_p^+$ (wherein p=1, 2 or 3) or $F^+$, some ions are chemically reacted with the W on the etching reaction surface, and a resultant reaction product $WF_x$ is released into the gas phase to be adsorbed onto the pattern side face of the WC substrate 11 and the side face of the resist pattern 12 during the etching. The adsorbed $WF_x$ is deposited on the pattern side face to form a part of the sidewall protecting film 14a. As a result, the actually formed sidewall protecting film 14a is made of a mixture of the CHFN polymer and the $WF_x$ compound.

In the conventional technique, owing to an ion component obliquely entering the substrate like the ion 13c of $CF_p^+$ (wherein p=1, 2 or 3) or $F^+$, the pattern side face is etched to be formed in a bowing shape. On the contrary, in this embodiment, the etching of the pattern side face by the ion 13c is prevented by the sidewall protecting film 14a, and hence, the bowing shape caused in the conventional technique can be avoided. As a result, a fine concavo-convex pattern with side faces in a vertical or downward tapered shape can be formed. Although not shown in FIG. 1B, when the supply amount of the hydrocarbon included in the etching gas is increased, the thickness of the sidewall protecting film 14a can be increased, so that the pattern side face can be formed in a downward tapered shape.

As described so far, according to the dry etching method of this embodiment, rapid etching for attaining a highly precise vertical shape free from a bowing shape can be formed on and inside a WC alloy including tungsten and carbon as principal components.

In this manner, as the essence of this invention, the etching of W by an ion including a fluorine atom, the etching of C by an ion including a nitrogen atom and an effect to protect the side face of a pattern to be formed through the etching by a hydrocarbon molecule (including a molecule produced through dissociation of hydrocarbon) are simultaneously attained.

In this embodiment, the ion including a fluorine atom produced in the plasma 50 may be a fluorine atom ion, a fluorine molecule ion, a fluorocarbon ion, a fluorohydrocarbon ion or the like. In order to produce such an ion including a fluorine atom in the plasma 50, any of a fluorine molecule, fluorocarbon and fluorohydrocarbon or a mixture of two or more of them is used as the gas including a fluorine atom. For example, a gas of $F_2$, $CF_4$, $C_2F_6$, $C_3F_8$, $C_4F_6$, (cyclic or linear) $C_4F_8$, (cyclic or linear) $C_5F_8$, $CHF_3$, $CH_2F_2$, $CH_3F$ or the like, or a CF gas with a higher molecular weight for ecological use may be used. When such a gas is used, fluorine necessary for etching the tungsten (W) included in the substance including W and C can be efficiently produced through plasma discharge.

Furthermore, in this embodiment, the ion including a nitrogen atom produced in the plasma 50 may be a nitrogen atom ion, a nitrogen molecule ion, a hydrogenated nitrogen molecule ion or the like. In order to produce such an ion including a nitrogen atom in the plasma 50, a nitrogen molecule ($N_2$) or an ammonia molecule ($NH_3$), or a mixture thereof is used as the gas including a nitrogen atom. When such a gas is used, the ion including a nitrogen atom can be efficiently produced through the plasma discharge, and hence, the carbon (C) included in the substance including W and C can be efficiently removed through etching.

Moreover, as the hydrocarbon molecule used as the etching gas in this embodiment, a molecule of $C_{2i}H_{(2i+2)}$, $C_{2i}H_{(2i+1)}$, $C_{2i}H_{2i}$ or the like (wherein i is a natural number) is used. Also, the hydrocarbon molecule may be linear or cyclic. Furthermore, the hydrocarbon molecule is not limited to a molecule represented as above. Specifically, for example, any of $CH_4$, $C_2H_4$, $C_2H_6$, . . . , $C_4H_8$, etc. may be used. However, a saturated hydrocarbon molecule, $C_{2i}H_{(2i+2)}$, is practically preferably used. Since the saturated hydrocarbon molecule does not include a double bond, it can be easily decomposed through the plasma discharge, and $CH_r$ (wherein r=1 through 3) can be efficiently produced as a decomposition product. Accordingly, the protecting film for the pattern side face can be efficiently formed from the $CH_r$ during the etching. Also, since a small decomposition (dissociation) molecule such as $CH_r$ (wherein r=1 through 3) particularly has a small adsorption coefficient, it can enter the inside of a fine structure pattern with a high aspect ratio (a depth/width ratio). In particular, $CH_4$, that is, the smallest molecule among saturated hydrocarbon molecules, has the largest H/C ratio, and hence has the lowest deposition property among the saturated hydrocarbon molecules. This property is remarkable particularly when molecules not dissociated are compared. Therefore, for efficiently producing the $CH_r$ (wherein r=1 through 3) radical affecting the side face of a fine pattern, $CH_4$ is the easiest to handle and practically the most effective.

Furthermore, in this embodiment, the gas including a fluorine atom and the gas including a nitrogen atom may be replaced with a gas including a fluorine atom and a nitrogen atom ($NH_3$, $N_2F$ or the like). Alternatively, the gas including a fluorine atom and the gas including a hydrocarbon molecule may be replaced with a gas including a fluorine atom and a hydrocarbon molecule. Specifically, a gas of, for example, HFE-227 me ($CF_3OCHFCF_3$), tetrafluorooxetane ($CF_2CF_2OCH_2$), hexafluoroisopropanol (($CF_3$)$_2$CHOH), HFE-245 mf ($CF_2CH_2OCHF_2$), HFE-347 mcf ($CHF_2OCH_2CF_2CF_3$), HFE-245 mc ($CHF_3OCF_2CF_3$), HFE-347 mf-c ($CF_3CH_2OCF_2CF_2H$), HFE-236me ($CHF_2OCH_2CHFCF_3$) or the like may be used. It is noted that these gases are gases with a small warming coefficient for use against the global warming and are friendly to the environment.

Moreover, in this embodiment, an oxygen atom, an oxygen molecule, an oxygen atom ion or an oxygen molecule ion may be further produced in the plasma 50 generated for producing the ion including a fluorine atom, the ion including a nitrogen atom and the hydrocarbon molecule. For this purpose, a gas including an oxygen atom is further mixed with the mixed gas of the gas including a fluorine atom, the gas including a nitrogen atom and the gas including a hydrocarbon molecule. When any of an oxygen molecule, a nitrogen oxide molecule, a sulfur oxide molecule and a carbon oxide molecule or a mixture of two or more of them is used as the gas including an oxygen atom, oxygen can be efficiently supplied. When the gas including an oxygen atom is thus additionally used, oxygen radicals and the like can be efficiently produced through the plasma discharge, and hence, the carbon (C) included in the substance including W and C and a deposition such as an excessive portion of the sidewall protecting film can be appropriately removed and the etching rate of the substance can be increased. This is because an effect to remove the carbon in the form of $CO_2$ or CO is caused by an oxygen radical or an oxygen ion in addition to the aforementioned effect to remove the carbon. This effect is sufficiently caused even when the flow rate of the gas including an oxygen atom is less than 10% of the whole gas flow rate. Practically, the flow rate of the gas including an oxygen atom is set to a desired flow rate within a range of approximately 50% or less of the whole gas flow rate. It is noted that $O_2$, $CO_2$, CO, SO, $SO_2$, $SO_3$, $N_2O$, NO or $NO_2$ may be used as the gas including an oxygen atom.

Furthermore, in this embodiment, an inert gas may be further mixed in the plasma 50 generated for producing the ion including a fluorine atom, the ion including a nitrogen atom and the hydrocarbon molecule. For this purpose, an inert gas is further mixed with the mixed gas of the gas including a fluorine atom, the gas including a nitrogen atom and the gas including a hydrocarbon molecule. When an inert gas is mixed, the plasma discharge can be further stabilized due to an inert gas effect, and hence, what is called a process window can be easily increased. Specifically, when an inert gas is mixed at a flow rate several times as large as the total flow rate of the gas including a fluorine atom, the gas including a nitrogen atom and the gas including a hydrocarbon molecule, the electron temperature within the plasma is regulated by the electron temperature of the inert gas, resulting in stabilizing the plasma discharge. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas, and therefore, when plasma with a higher electron temperature is desired to generate, an inert gas with a smaller atomic number is used, and when plasma with a lower electron temperature is desired to generate, an inert gas with a larger atomic number is used. At this point, two or more inert gases may be mixedly used.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system. Also, the optimal etching conditions are different depending upon the method employed by the etching system, and the ranges of the etching conditions of this embodiment are, for example, a gas flow rate of several tens through several hundreds cc/min. (at room temperature), a pressure of 0.1 through 20 Pa, a high-frequency power for plasma generation of 100 through several kW, and an RF bias voltage of 100 through 1 kW.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained in etching a WCN alloy or a WNC alloy.

Embodiment 2

Now, a dry etching method according to Embodiment 2 of the invention will be described with reference to the accompanying drawings. A difference of the dry etching method of this embodiment from that of Embodiment 1 is that a substance including tungsten and carbon as principal compositions is dry etched by using plasma generated with a gas including a hydrogen atom (such as a hydrogen molecule or an ammonia molecule) further added to the mixed gas of the gas including a fluorine atom, the gas including a nitrogen atom and the gas including a hydrocarbon molecule.

Figure 2A:
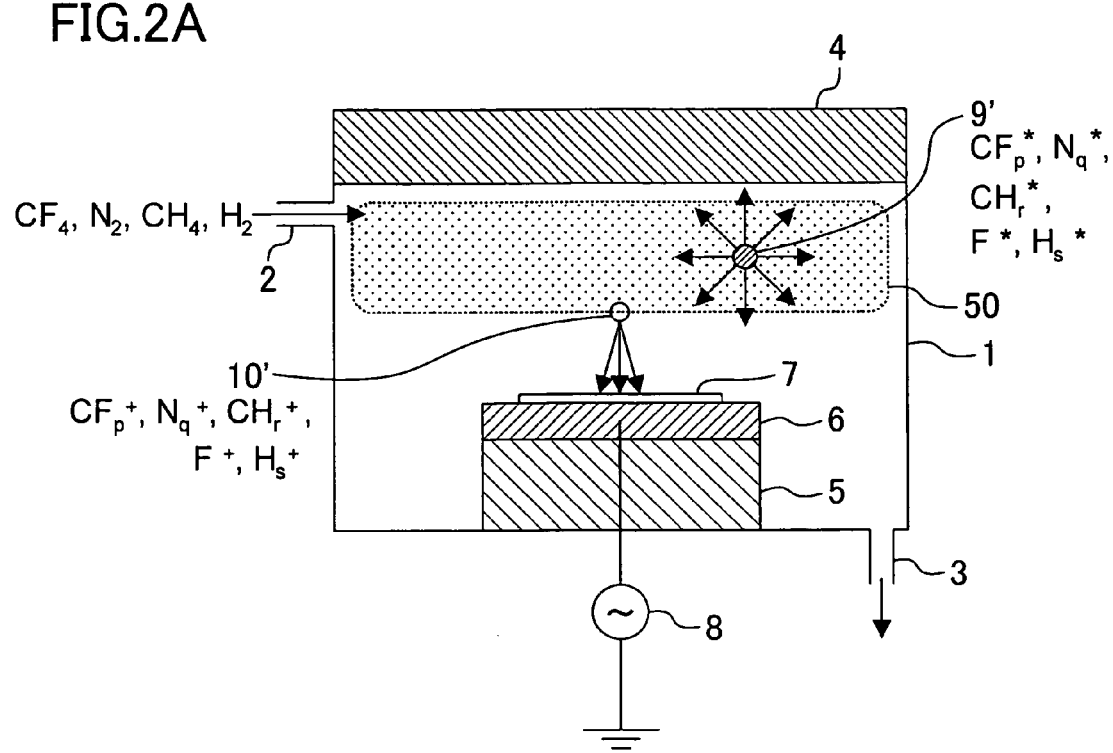
FIGS. 2A and 2B are explanatory diagrams of a dry etching method according to Embodiment 2 of the invention.
Figure 2B:
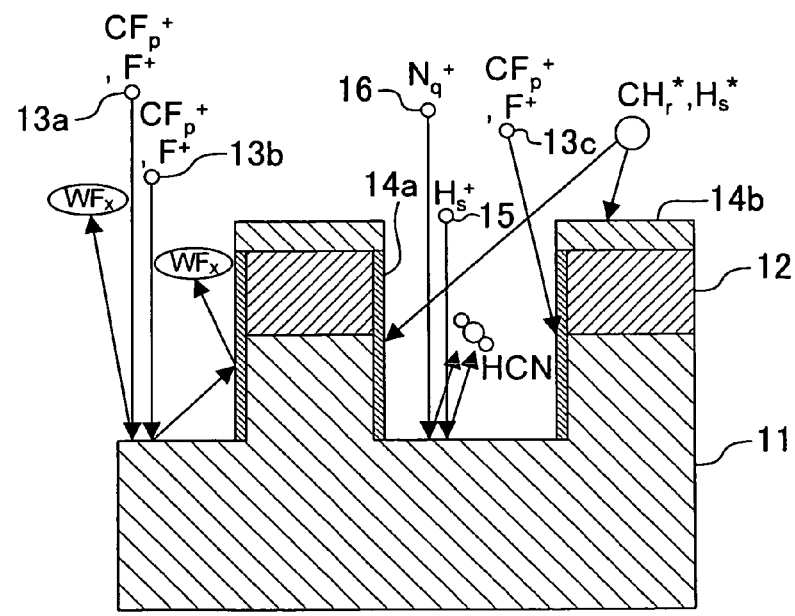

FIGS. 2A and 2B are explanatory diagrams of the dry etching method of Embodiment 2 of the invention. In FIGS. 2A and 2B, like reference numerals are used to refer to like elements used in Embodiment 1 so as to omit the description. Also, in FIGS. 2A and 2B, a mixed gas of $CF_4$, $N_2$, $CH_4$ and $H_2$ is used as an etching gas.

As shown in FIG. 2A, a difference of this embodiment from Embodiment 1 is that radicals 9' of $CF_p^*$ (wherein p=1, 2 or 3), $N_q^*$ (wherein q=1, or 2), $CH_r^*$ (wherein r=1, 2 or 3), $F^*$ and $H_s^*$ (wherein s=1 or 2) and ions 10' of $CF_p^+$ (wherein p=1, 2 or 3), $N_q^+$ (wherein q=1 or 2), $CH_r^+$ (wherein r=1, 2 or 3), $F^+$ and $H_s^+$ (wherein s=1 or 2) are produced in plasma 50. In other words, although a hydrogen atom and a hydrogen atom ion alone are produced from a hydrocarbon molecule in Embodiment 1, a hydrogen molecule radical and a hydrogen molecule ion are additionally produced in this embodiment.

The etching reaction caused on the surface of the WC substrate will now be described in more detail with reference to FIG. 2B.

In this embodiment, a hydrogen molecule radical and a hydrogen molecule ion are more efficiently produced through the plasma discharge than in Embodiment 1, and hence, the etching efficiency for the carbon (C) included in the substance including W and C can be increased. The etching efficiency is thus increased because the probability of producing HCN through an ion assist reaction caused when a $H_s^+$ ion 15 enters a portion of the WC surface where a nitrogen radical ($N_q^*$ (wherein q=1 or 2)) is adsorbed and the probability of producing HCN through an ion assist reaction caused when a $N_q^+$ ion 16 enters a portion of the WC surface where a hydrogen radical ($H_s^*$ (wherein s=1 or 2)) is adsorbed are both increased. At this point, the reaction probability of the ion assist reaction caused when a nitrogen ion enters a portion of the WC substrate where a hydrogen radical is adsorbed is higher than that of the ion assist reaction caused when a hydrogen ion enters a portion of the WC substrate where a nitrogen radical is adsorbed. This is because the mass of nitrogen is 14 times as large as that of hydrogen and hence the ion impact of nitrogen caused on the etching reaction surface is also 14 times as large as that of hydrogen (in the case where they enters at the same acceleration energy). However, in order to sufficiently attain the 14-fold efficiency, a sufficient amount of hydrogen should be present on the etching reaction surface. Therefore, when the amount of produced hydrogen is increased as in this embodiment, the etching efficiency for the C can be increased. As a result, the synergistic effect of the etching for the W by the ion including a fluorine atom and the aforementioned etching for the C is increased, so that the substance including W and C can be further highly efficiently and more rapidly etched than in Embodiment 1.

In this manner, in Embodiment 2, since the plasma is generated with the gas capable of increasing the supply amount of hydrogen, such as a hydrogen molecule or an ammonia molecule, further added to the mixed gas of the gas including a fluorine atom, the gas including a nitrogen atom and the gas including a hydrocarbon molecule, the following effect can be attained in addition to the effects attained in Embodiment 1: Since the amount of hydrogen (specifically, a hydrogen atom, a hydrogen molecule, a hydrogen atom ion and a hydrogen molecule ion) produced through the plasma discharge is increased, the etching efficiency for the carbon (C) included in the substance including W and C can be increased, and hence, the substance can be highly efficiently etched in a vertical or downward tapered shape.

Although Embodiment 2 is herein described by exemplifying the case where the plasma 50 is generated from the mixed gas of $CF_4$, $N_2$, $CH_4$ and $H_2$ as shown in FIGS. 2A and 2B, $H_2$ of the mixed gas may be replaced with $NH_3$. In this case, neither a $H_2$ radical nor a $H_2$ ion is produced but a hydrogen atom and a hydrogen atom ion are highly efficiently produced, and therefore, the same effects as those of this embodiment can be attained. Also, when $NH_3$ is used, an effect to supply N can be obtained, and hence, the etching efficiency for the C can be increased because of the increase of the supply amount of N.

Embodiment 3

Now, a dry etching method according to Embodiment 3 of the invention will be described with reference to the accompanying drawings. A difference of the dry etching method of this embodiment from that of Embodiment 1 is that a substance including tungsten and carbon as principal components is dry etched by using plasma generated with at least one of a gas including a chlorine atom, a gas including a bromine atom and a gas including an iodine atom further added to the mixed gas of the gas including a fluorine atom, the gas including a nitrogen atom and the gas including a hydrocarbon molecule. In other words, an ion including a chlorine atom, an ion including a bromine atom or an ion including an iodine atom is produced in addition to an ion including a fluorine atom, an ion including a nitrogen atom, an ion including a hydrocarbon molecule in the plasma in this embodiment.

Figure 3A:
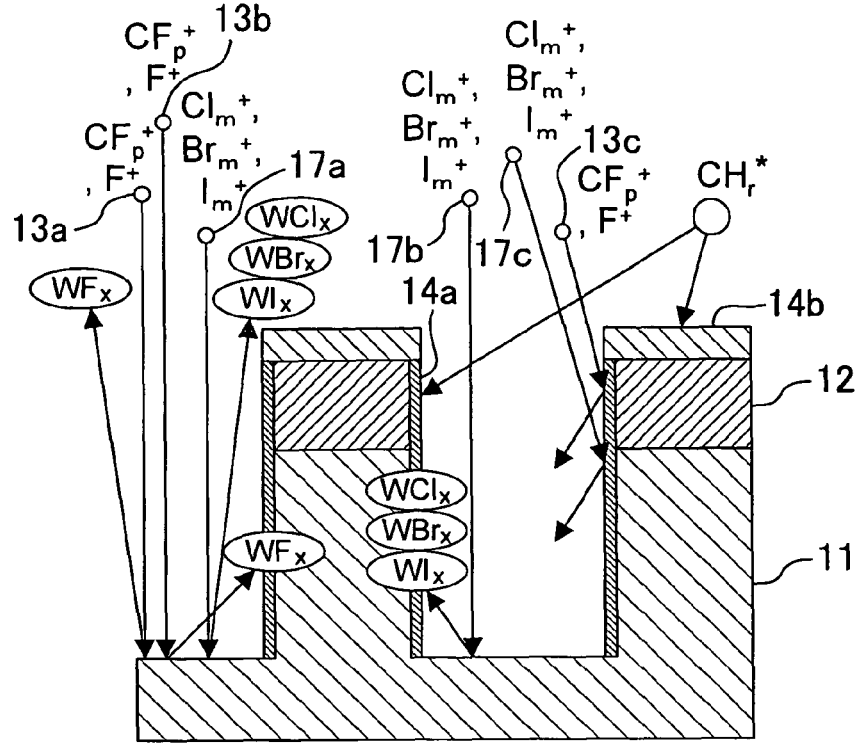
FIGS. 3A and 3B are explanatory diagrams of a dry etching method according to Embodiment 3 of the invention.
Figure 3B:
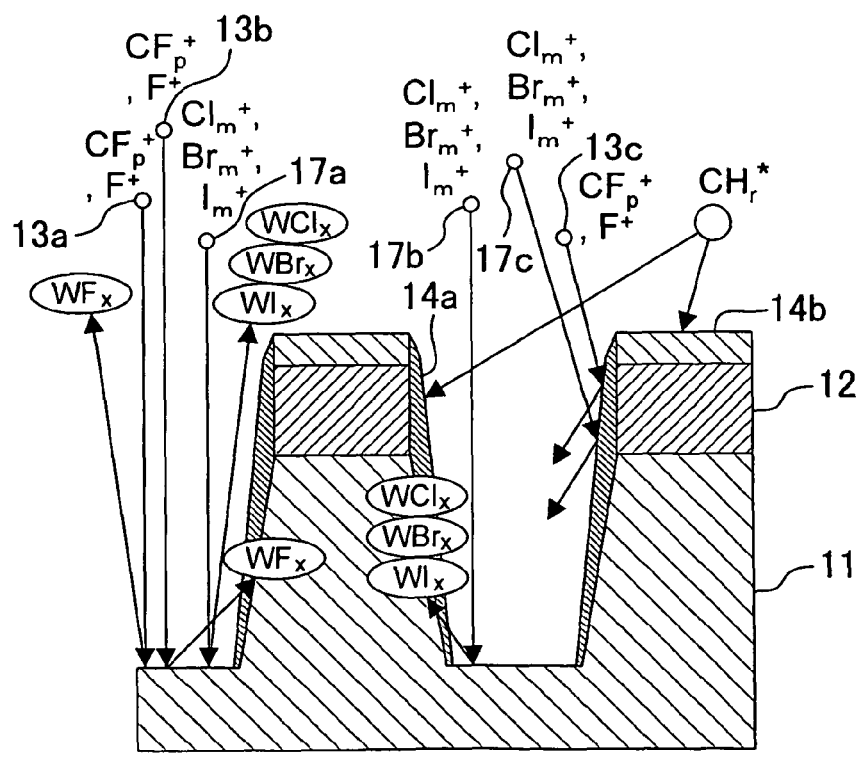

FIGS. 3A and 3B are explanatory diagrams of the dry etching method of Embodiment 3 of the invention, in each of which a state of a WC substrate being etched by the dry etching method of this embodiment is shown. Specifically, FIG. 3A shows a case where a sidewall protecting film is formed in a small thickness and FIG. 3B shows a case where a sidewall protecting film is formed in a large thickness. Also, in FIGS. 3A and 3B, like reference numerals are used to refer to like elements used in Embodiment 1 so as to omit the description. Now, the dry etching method of this embodiment will be described by exemplifying a case where $Cl_2$, $Br_2$ and $I_2$ are used respectively as the gas including a chlorine atom, the gas including a bromine atom and the gas including an iodine atom to be added to the etching gas of Embodiment 1.

Since the basic mechanism of the etching is the same as that of Embodiment 1, the effect attained by a $Cl^+$ ion, a $Br^+$ ion and an $I^+$ ion corresponding to the difference from Embodiment 1 will be specifically described.

As shown in FIGS. 3A and 3B, after forming a resist pattern 12 on a WC substrate 11, the WC substrate 11 is etched by using the resist pattern 12 as a mask. Specifically, in addition to the etching reaction for tungsten caused by ions 13a, 13b and 13c including fluorine atoms, which are the same as those of Embodiment 1, the tungsten included in the WC substrate 11 is etched also by ions 17a, 17b and 17c corresponding to a $Cl_m^+$ ion (wherein m=1 or 2) produced from $Cl_2$, a $Br_m^+$ ion (wherein m=1 or 2) produced from $Br_2$ and an $I_m^+$ ion (wherein m=1 or 2) produced from 12. At this point, reaction products are released into the gas phase and removed in the form of $WCl_x$, $WBr_x$, or $WI_x$ (wherein x=1 through 6). Furthermore, a part of an etching reaction product produced by the ion 17b corresponding to a $Cl_m^+$ ion, a $Br_m^+$ ion or an $I_m^+$ ion is adsorbed again onto an etched side face of the WC substrate 11 or the side face of the resist pattern 12 so as to form a sidewall protecting film 14a. The adsorption probabilities attained at this point are in the order of $WI_x > WBr_x > WCl_x > WF_x$. Accordingly, the sidewall protecting film 14a of this embodiment is made of not a mixture of $CH_r$ (wherein r=1, 2 or 3) and $WF_x$ as in Embodiment 1 but a mixture of $CH_r$, and $WCl_x$, $WBr_x$ or $WI_x$. As a result, an etching reaction caused on the pattern side face of the WC substrate 11 by an ion obliquely entering the substrate surface like ions 13c and 17c is prevented by the sidewall protecting film 14a. Accordingly, in the case where the sidewall protecting film 14a is comparatively thin, a vertical etching shape can be realized on and inside the WC substrate 11 as shown in FIG. 3A, and in the case where the sidewall protecting film 14a is comparatively thick, a downward tapered etching shape can be realized on and inside the WC substrate 11 as shown in FIG. 3B.

As described so far, in the case where the gas for producing a $Cl_m^+$ ion, a $Br_m^+$ ion or an $I_m^+$ ion is additionally used, owing to such a gas, an effect to form the sidewall protecting film is more remarkable than the effect to etch the tungsten.

In this embodiment, the mixing ratio of the gas including a chlorine atom, the gas including a bromine atom or the gas including an iodine atom is approximately 50% or less of the total gas flow rate. Also, in the case where the gas including a bromine atom or the gas including an iodine atom is used, even when the mixing ratio to the total gas flow rate is less than 5%, the effect to form the sidewall protecting film can be sufficiently attained. Furthermore, as described in Embodiment 1, a vertical etching shape can be realized through the etching using the plasma for producing an ion including a fluorine atom, an ion including a nitrogen atom and a hydrocarbon molecule. Therefore, in the case where a vertical etching shape is desired to attain with the gas for producing a $Cl_m^+$ ion, a $Br_m^+$ ion or an $I_m^+$ ion additionally used, the mixing ratio to the total gas flow rate of the gas including a chlorine atom, the gas including a bromine atom or the gas including an iodine atom may be less than several %.

In this embodiment, the first effect attained by additionally using the gas for producing a $Cl_m^+$ ion, a $Br_m^+$ ion or an $I_m^+$ ion is exhibited particularly when the substance including W and C is subjected to high-aspect ratio etching, namely, is deeply etched. Specifically, since $CH_r^*$ radicals are supplied while diffusing from above and into an etched pattern (a recess), the thickness of the sidewall protecting film formed on the bottom of the etched pattern is smaller than that formed on an upper portion of the etched pattern. On the contrary, $WCl_x$, $WBr_x$ or $WI_x$ produced through the etching reaction caused by a $Cl_m^+$ ion, a $Br_m^+$ ion or an $I_m^+$ ion is released from the bottom of the etched pattern corresponding to the etching reaction surface and adsorbed again onto the side face of the etched pattern, and therefore, it is more easily adsorbed onto a lower portion of the side face of the etched pattern than an upper portion thereof. In this manner, when the plasma for producing an ion including a fluorine atom, an ion including a nitrogen atom and a hydrocarbon molecule further produces a $Cl_m^+$ ion, a $Br_m^+$ ion or an $I_m^+$ ion, vertical etching processing with a high aspect ratio can be realized.

Moreover, the second effect attained by additionally using the gas for producing a $Cl_m^+$ ion, a $Br_m^+$ ion or an $I_m^+$ ion in this embodiment is that a downward tapered shape can be easily realized as shown in FIG. 3B. Specifically, when the gas including a chlorine atom, the gas including a bromine atom or the gas including an iodine atom is mixed in a ratio of 5% or more to the total gas flow rate of the gas used for generating the plasma, the sidewall protecting film 14a can be easily formed in a comparatively large thickness owing to the mechanism for forming the sidewall protecting film described above. As a result, when the mixing ratio of the gas including a chlorine atom, the gas including a bromine atom or the gas including an iodine atom is adjusted in a range from several % to 30%, the tapered shape resulting from the etching can be freely changed. It is noted that the mixing ratio does not completely equally correspond to the tapered shape but the tapered shape is affected also by mixed gas species, plasma generation conditions and the like. Accordingly, not only when the mixing ratio is 30% but also when it is as high as approximately 50%, the controllability for the tapered shape may be kept.

The ability to form the sidewall protecting film by tungsten halide, that is, a reaction product, is in the order of $WI_x \gg WBr_x \gg WCl_x > WF_x$. Therefore, in the case where the gas including a chlorine atom, the gas including a bromine atom or the gas including an iodine atom is additionally used, it is necessary to optimize the mixing ratio of each gas. Also, a mixture of the gas including a chlorine atom, the gas including a bromine atom or the gas including an iodine atom may be used.

As described so far, in Embodiment 3, the substance including W and C is etched by using the plasma for producing not only an ion including a fluorine atom, an ion including a nitrogen atom and a hydrocarbon molecule but also an ion including a chlorine atom, an ion including a bromine atom or an ion including an iodine atom, and therefore, the following effect can be attained in addition to the effects attained in Embodiment 1: Since the sidewall protecting effect for an etched portion can be increased, not only a vertical shape but also an arbitrary downward tapered shape can be easily realized in etching with a high aspect ratio.

In this embodiment, for example, $Cl_2$, HCl, $ClF_3$ or the like may be used as the gas including a chlorine atom. Also, for example, $Br_2$, HBr or the like may be used as the gas including a bromine atom. Furthermore, for example, $I_2$, HI or the like may be used as the gas including an iodine atom. Alternatively, a gas including a chlorine atom and at least one of a bromine atom and an iodine atom, such as ICl, $ClF_2Br$, $ClF_2I$ or BrCl, may be used. Alternatively, a molecular gas including carbon, fluorine and halogen, such as $CF_xCl_{4-x}$, $CF_xBr_{4-x}$ or $CF_xI_{4-x}$ (wherein x=1 through 3), may be used. In this case, the effect to increase the etching rate obtained by F can be simultaneously expected as in Embodiment 2. Specifically, W reacts with halogen (F, Cl, Br or I) to be vaporized in the form of a reaction product of $WF_6$, $WCl_6$, $WBr_6$ or $WI_6$, so as to proceed the etching reaction. The volatility of $WF_6$ is high (namely, its vapor pressure is low) but the volatility of tungsten halide such as $WCl_6$, $WBr_6$ or $WI_6$ is low, and hence, the etching reaction itself is the most easily caused in using F. Accordingly, for increasing the etching rate for the W, F is the most suitably used.

Furthermore, in this embodiment a gas including a chlorine atom and a nitrogen atom (such as $NCl_3$), a gas including a bromine atom or an iodine atom and a nitrogen atom (such as $NBr_3$ or $NI_3$) or a gas including a chlorine atom and an oxygen atom (which may further include a bromine atom, an iodine atom or a nitrogen atom; such as $COCl_2$, $ClFO_3$, NOCl, $NO_2Cl$, $SOCl_2$, $SO_2Cl_2$ or $SO_3HCl$) may be used.

Embodiment 4

Now, a fine structure formation method and a mold fabrication method by employing the same according to Embodiment 4 of the invention will be described with reference to the accompanying drawings. It is noted that the dry etching methods described in Embodiments 1 through 3 are applied in this embodiment.

FIGS. 4A through 4F are cross-sectional views for showing procedures in the mold fabrication method of Embodiment 4.

Figure 4A:
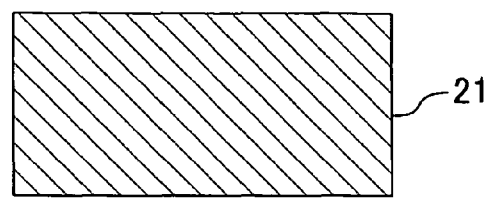
FIGS. 4A, 4B, 4C, 4D, 4E and 4F are cross-sectional views for showing procedures in a fine structure formation method according to Embodiment 4 of the invention and a mold fabrication method by employing the same.
Figure 4B:
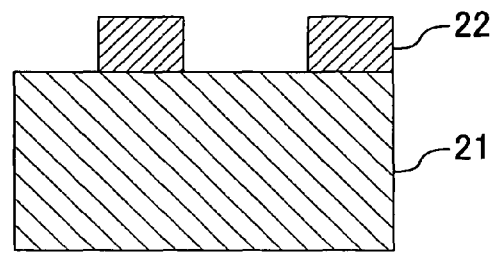

First, a WC alloy substrate 21 is prepared as shown in FIG. 4A, and then, a resist pattern 22 is formed on the WC alloy substrate 21 as shown in FIG. 4B. At this point, the resist pattern 22 is generally formed through the lithography technique.

Next, under etching conditions for forming a sidewall protecting film in a small thickness (see Embodiment 3 (and FIG. 3A in particular)), the WC alloy substrate 21 is dry etched, with the resist pattern 22 used as a mask, by using plasma generated from a mixed gas at least of a gas including a fluorine atom, a gas including a nitrogen atom and a gas including a hydrocarbon molecule, thereby transferring the pattern onto the WC alloy substrate 21. In general, no matter which type of dry etching system is used for the dry etching, ions 23 entering the WC alloy substrate 21 from the plasma have energy spread, and therefore, there are not only a component A vertically entering the substrate surface but also components entering the substrate surface at an angle, namely, obliquely entering components B and C. However, when the dry etching is performed by using the plasma generated from the mixed gas at least of the gas including a fluorine atom, the gas including a nitrogen atom and the gas including a hydrocarbon molecule, etching reaction products such as $WF_x$ (wherein x=1 through 6) form a sidewall protecting film 24a on the side face of the etched portion, and therefore, the side face can be prevented from being etched by the obliquely entering components B and C of the ions 23. Accordingly, as shown in FIG. 4C, a fine structure having a cross-section vertical to the substrate surface as the etched cross-section is formed.

Next, the resist pattern 22 and the sidewall protecting film 24a are removed by ashing and cleaning. In this manner, a WC alloy mold made of the WC alloy substrate 21 having a fine concavo-convex pattern with vertical side faces is fabricated as shown in FIG. 4D.

Figure 4C:
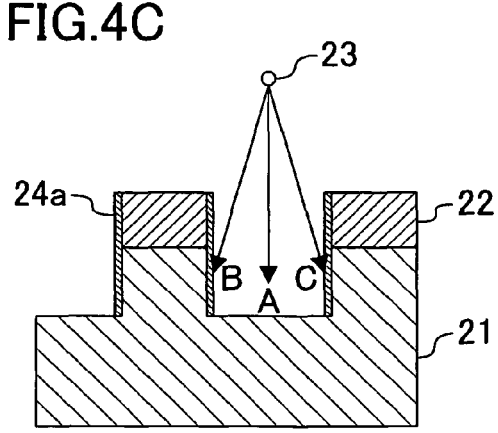
Figure 4E:
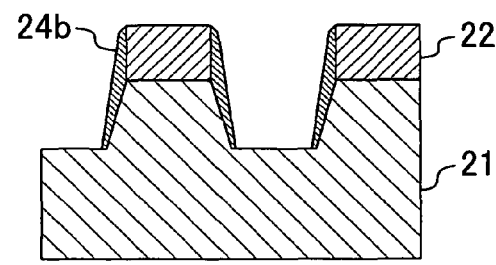
Figure 4D:
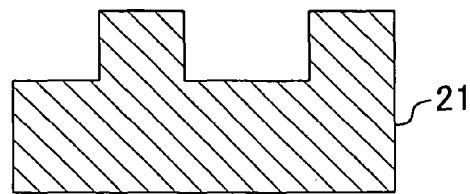

On the other hand, instead of the procedures shown in FIGS. 4C and 4D, the pattern may be transferred onto the WC alloy substrate 21 by dry etching the WC alloy substrate 21, with the resist pattern 22 used as a mask, by using plasma generated from a mixed gas at lest of a gas including a fluorine atom, a gas including a nitrogen atom and a gas including a hydrocarbon molecule under etching conditions for forming a sidewall protecting film in a large thickness (see Embodiment 3 (and FIG. 3B in particular)) as shown in FIG. 4E. In this case, a fine structure having a downward tapered shape as the etched cross-section is formed in the WC alloy substrate 21. This is because since a sidewall protecting film 24b is deposited in a thickness larger than a necessary thickness for preventing the side face from being etched by the ions, an opening area of the etched portion becomes narrower as the etching is proceeded.

Figure 4F:
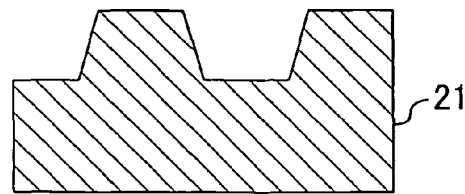

Next, the resist pattern 22 and the sidewall protecting film 24b are removed by the ashing and the cleaning. In this manner, a WC alloy mold made of the WC alloy substrate 21 having a fine concavo-convex structure with downward tapered side faces is fabricated as shown in FIG. 4F.

As described so far, the fine structure formation method and the mold fabrication method of this embodiment include the steps of forming a resist pattern on a substance including tungsten and carbon and etching the substance, with the resist pattern used as a mask, by using plasma generated from a mixed gas at least of a gas including a fluorine atom, a gas including a nitrogen atom and a gas including a hydrocarbon molecule. In other words, since the dry etching method of this invention (according to any of Embodiments 1 through 3) is employed in this embodiment, the surface and the inside of the substance including tungsten and carbon can be etched in a highly precise vertical shape or a highly precise downward tapered shape free from a bowing shape. Accordingly, a mold made of the substance including W and C and having a fine concavo-convex pattern with a vertical cross-sectional shape or a downward tapered cross-sectional shape can be definitely fabricated.

Although the resist pattern is used as the etching mask in this embodiment, it goes without saying that a hard mask made of an insulating film or the like may be used instead.

In this embodiment, the ion including a fluorine atom produced in the plasma may be a fluorine atom ion, a fluorine molecule ion, a fluorocarbon ion, a fluorohydrocarbon ion or the like. In order to produce such an ion including a fluorine atom in the plasma, any of a fluorine molecule, fluorocarbon and fluorohydrocarbon or a mixture of two or more of them is used as the gas including a fluorine atom. For example, a gas of $F_2$, $CF_4$, $C_2F_6$, $C_3F_8$, $C_4F_6$, (cyclic or linear) $C_4F_8$, (cyclic or linear) $C_5F_8$, $CHF_3$, $CH_2F_2$, $CH_3F$ or the like, or a CF gas with a higher molecular weight for ecological use may be used. When such a gas is used, fluorine necessary for etching the tungsten (W) included in the substance including W and C can be efficiently produced through the plasma discharge. Therefore, the substance including W and C can be more inexpensively etched into a highly precise vertical shape or a highly precise downward tapered shape. As a result, the mold having the fine concavo-convex pattern with highly precise vertical or highly precise downward tapered side faces can be more inexpensively fabricated.

Furthermore, in this embodiment, the ion including a nitrogen atom produced in the plasma may be a nitrogen atom ion, a nitrogen molecule ion, a hydrogenated nitrogen molecule ion or the like. In order to produce such an ion including a nitrogen atom in the plasma, a nitrogen molecule ($N_2$) or an ammonia molecule ($NH_3$), or a mixture thereof is used as the gas including a nitrogen atom. When such a gas is used, the ion including a nitrogen atom can be efficiently produced through the plasma discharge, and hence, the carbon (C) included in the substance including W and C can be efficiently removed through etching. Therefore, the mold having the fine concavo-convex pattern with a vertical cross-section or a downward tapered cross-section can be rapidly fabricated.

Moreover, as the hydrocarbon molecule used as the etching gas in this embodiment, a molecule of $C_{2i}H_{(2i+2)}$, $C_{2i}H_{(2i+1)}$, $C_{2i}H_{2i}$ or the like (wherein i is a natural number) is used. Also, the hydrocarbon molecule may be linear or cyclic. Furthermore, the hydrocarbon molecule is not limited to a molecule represented as above. Specifically, for example, any of $CH_4$, $C_2H_4$, $C_2H_6$, . . . , $C_4H_8$, etc. may be used. However, a saturated hydrocarbon molecule, $C_{2i}H_{(2i+2)}$, is practically preferably used. Since the saturated hydrocarbon molecule does not include a double bond, it can be easily decomposed through the plasma discharge, and $CH_r$ (wherein r=1 through 3) can be efficiently produced as a decomposition product. Accordingly, the protecting film for the pattern side face can be efficiently formed from the $CH_r$ during the etching, and therefore, the mold having the fine concavo-convex pattern with a vertical cross-section or a downward tapered cross-section can be definitely fabricated. Also, since a small decomposition (dissociation) molecule such as $CH_r$ (wherein r=1 through 3) particularly has a small adsorption coefficient, it can enter the inside of a fine structure pattern with a high aspect ratio (a depth/width ratio). In particular, $CH_4$, that is, the smallest molecule among saturated hydrocarbon molecules, has the largest H/C ratio, and hence has the lowest deposition property among the saturated hydrocarbon molecules. This property is remarkable particularly when molecules not dissociated are compared. Therefore, for efficiently producing the $CH_r$ (wherein r=1 through 3) radical affecting the side face of a fine pattern, $CH_4$ is the easiest to handle and practically the most effective.

Furthermore, in this embodiment, the gas including a fluorine atom and the gas including a nitrogen atom may be replaced with a gas including a fluorine atom and a nitrogen atom ($NH_3$, $N_2F$ or the like). Alternatively, the gas including a fluorine atom and the gas including a hydrocarbon molecule may be replaced with a gas including a fluorine atom and a hydrocarbon molecule. Specifically, a gas of, for example, HFE-227me ($CF_3OCHFCF_3$), tetrafluorooxetane ($CF_2CF_2OCH_2$), hexafluoroisopropanol (($CF_3$)$_2$CHOH), HFE-245mf ($CF_2CH_2OCHF_2$), HFE-347mcf ($CHF_2OCH_2CF_2CF_3$), HFE-245mc ($CHF_3OCF_2CF_3$), HFE-347mf-c ($CF_3CH_2OCF_2CF_2H$), HFE-236me ($CHF_2OCH_2CHFCF_3$) or the like may be used. It is noted that these gases are gases with a small warming coefficient for use against the global warming and are friendly to the environment.

Moreover, in this embodiment, an oxygen atom, an oxygen molecule, an oxygen atom ion or an oxygen molecule ion may be further produced in the plasma generated for producing the ion including a fluorine atom, the ion including a nitrogen atom and the hydrocarbon molecule. For this purpose, a gas including an oxygen atom is further mixed with the mixed gas of the gas including a fluorine atom, the gas including a nitrogen atom and the gas including a hydrocarbon molecule. When any of an oxygen molecule, a nitrogen oxide molecule, a sulfur oxide molecule and a carbon oxide molecule or a mixture of two or more of them is used as the gas including an oxygen atom, oxygen can be efficiently supplied. When the gas including an oxygen atom is thus additionally used, oxygen radicals and the like can be efficiently produced through the plasma discharge, and hence, the carbon (C) included in the substance including W and C and a deposition such as an excessive portion of the sidewall protecting film can be appropriately removed and the etching rate of the substance can be increased. Accordingly, the mold having the fine concavo-convex pattern with a vertical cross-section or a downward tapered cross-section can be further rapidly fabricated. This is because an effect to remove the carbon in the form of $CO_2$ or CO is caused by an oxygen radical or an oxygen ion in addition to the aforementioned effect to remove the carbon. This effect is sufficiently caused even when the flow rate of the gas including an oxygen atom is less than 10% of the whole gas flow rate. Practically, the flow rate of the gas including an oxygen atom is set to a desired flow rate within a range of approximately 50% or less of the whole gas flow rate. It is noted that $O_2$, $CO_2$, CO, SO, $SO_2$, $SO_3$, $N_2O$, NO or $NO_2$ may be used as the gas including an oxygen atom.

Furthermore, in this embodiment, an inert gas may be further mixed in the plasma generated for producing the ion including a fluorine atom, the ion including a nitrogen atom and the hydrocarbon molecule. For this purpose, an inert gas is further mixed with the mixed gas of the gas including a fluorine atom, the gas including a nitrogen atom and the gas including a hydrocarbon molecule. When an inert gas is mixed, the plasma discharge can be further stabilized due to the inert gas effect, and hence, what is called a process window can be easily increased, and the mold having the fine concavo-convex pattern with a vertical cross-section or a downward tapered cross-section can be stably fabricated.

Moreover, in this embodiment, the plasma is preferably generated with a gas including a hydrogen atom (such as a hydrogen molecule or an ammonia molecule) further mixed with the mixed gas of the gas including a fluorine atom, the gas including a nitrogen atom and the gas including a hydrocarbon molecule. In this manner, hydrogen produced from the plasma (specifically, a hydrogen atom, a hydrogen molecule, a hydrogen atom ion and a hydrogen molecule ion) can increase the etching efficiency for the carbon (C) included in the substance including W and C, and therefore, the mold having the fine concavo-convex pattern with a vertical cross-section or a downward tapered cross-section can be further rapidly fabricated.

Alternatively, in this embodiment, the plasma is preferably generated with at least one of a gas including a chlorine atom, a gas including a bromine atom and a gas including an iodine atom further mixed with the mixed gas of the gas including a fluorine atom, the gas including a nitrogen atom and the gas including a hydrocarbon molecule. In this manner, the side face protecting function for the etched portion caused by chlorine, bromine or iodine can be increased, and hence, a mold having a fine concavo-convex pattern with a downward tapered cross-section can be easily fabricated. As the gas including a chlorine atom, for example, $Cl_2$, HCl, $ClF_3$ or the like is used. Also, as the gas including a bromine atom, for example, $Br_2$, HBr or the like is used. As the gas including an iodine atom, $I_2$, HI or the like is used. Alternatively, a gas including a chlorine atom and at least one of a bromine atom and an iodine atom, such as ICl, $ClF_2Br$, $ClF_2I$ or BrCl, may be used. Further alternatively, a molecular gas including carbon, fluorine and halogen, such as $CF_xCl_{4-x}$, $CF_xBr_{4-x}$ or $CF_xI_{4-x}$ (wherein x=1 through 3), may be used. Also, a gas including a chlorine atom and a nitrogen atom (such as $NCl_3$), a gas including a bromine atom or an iodine atom and a nitrogen atom (such as $NBr_3$ or $NI_3$) or a gas including a chlorine atom and an oxygen atom (which may further include a bromine atom, an iodine atom or a nitrogen atom; such as $COCl_2$, $ClFO_3$, NOCl, $NO_2Cl$, $SOCl_2$, $SO_2Cl_2$ or $SO_3HCl$) may be used.

Moreover, in this embodiment, in the case where the gas including a chlorine atom, the gas including a bromine atom or the gas including an iodine atom is used, the mixing ratio of these gases is approximately 50% or less of the total gas flow rate. Specifically, when the gas including a chlorine atom, the gas including a bromine atom or the gas including an iodine atom is mixed in a ratio of 5% or more to the total gas flow rate of the gas used for generating the plasma, a sidewall protecting film can be easily formed in a comparatively large thickness owing to the mechanism for forming the sidewall protecting film. As a result, when the mixing ratio of the gas including a chlorine atom, the gas including a bromine atom or the gas including an iodine atom is adjusted in a range from several % to 50%, the tapered shape resulting from the etching can be freely changed.

Furthermore, the dimensional etching limit of the fine concavo-convex pattern obtained by the mold fabrication method of this embodiment largely depends upon the lithography technique employed for forming the resist pattern, and currently, the substance can be etched by the minimum dimension of approximately 50 nm.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system.

Although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained in etching a WCN alloy or a WNC alloy.

Embodiment 5

Now, a mold according to Embodiment 5 of the invention will be described with reference to the accompanying drawings. It is noted that the mold of this embodiment is obtained by the mold fabrication method described in Embodiment 4.

Figure 5A:
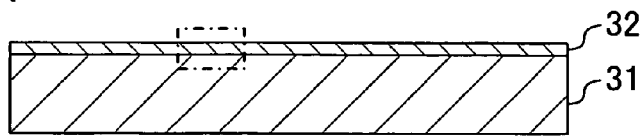
FIG. 5A is a cross-sectional view of a whole mold according to Embodiment 5 of the invention and FIGS. 5B, 5C, 5D, 5E, 5F and 5G are enlarged views for showing a fine concavo-convex pattern formed on the mold of FIG. 5A.

FIG. 5A is a cross-sectional view of the whole mold of this embodiment. As shown in FIG. 5A, a substance 32 including tungsten and carbon such as a WC alloy is formed on an underlying substrate 31. On the surface of the substance 32, a fine concavo-convex pattern with a vertical shape (a shape having a side face vertical to the substrate surface) or a downward tapered shape is formed by the dry etching method of any of Embodiments 1 through 3. Also, FIGS. 5B through 5D and 5E through 5G are enlarged views of the fine concavo-convex pattern formed on a surface portion (surrounded with an alternate long and short dash line) of the mold of FIG. 5A.

Figure 5B:
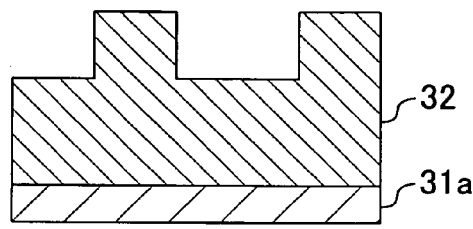
Figure 5E:
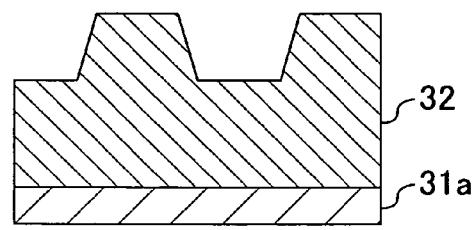
Figure 5C:
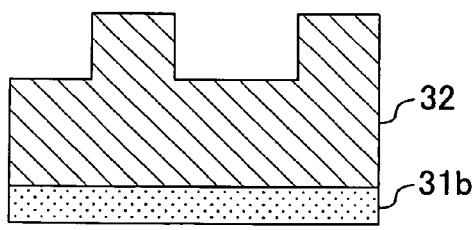
Figure 5F:
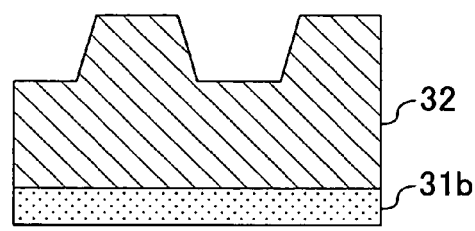
Figure 5D:
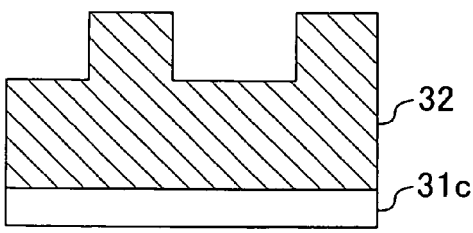
Figure 5G:
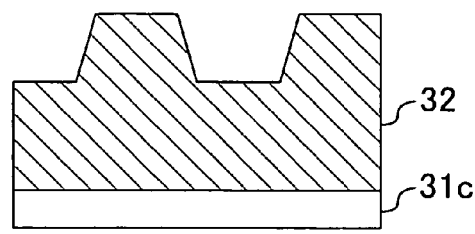
Figure 6A:
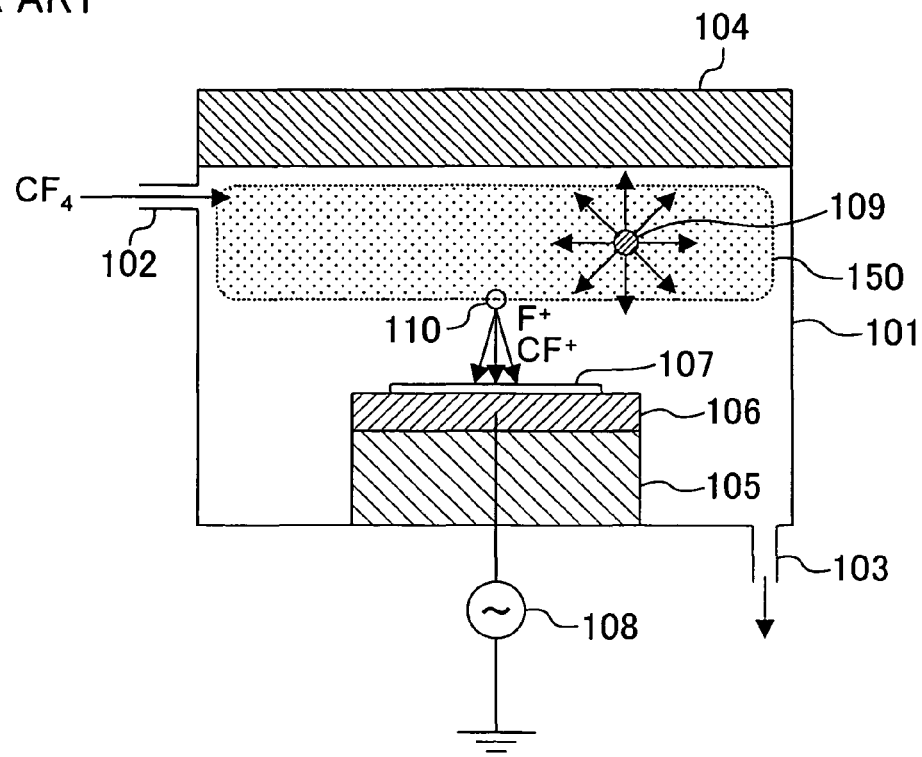
FIGS. 6A and 6B are explanatory diagrams of a conventional dry etching method.
Figure 6B:
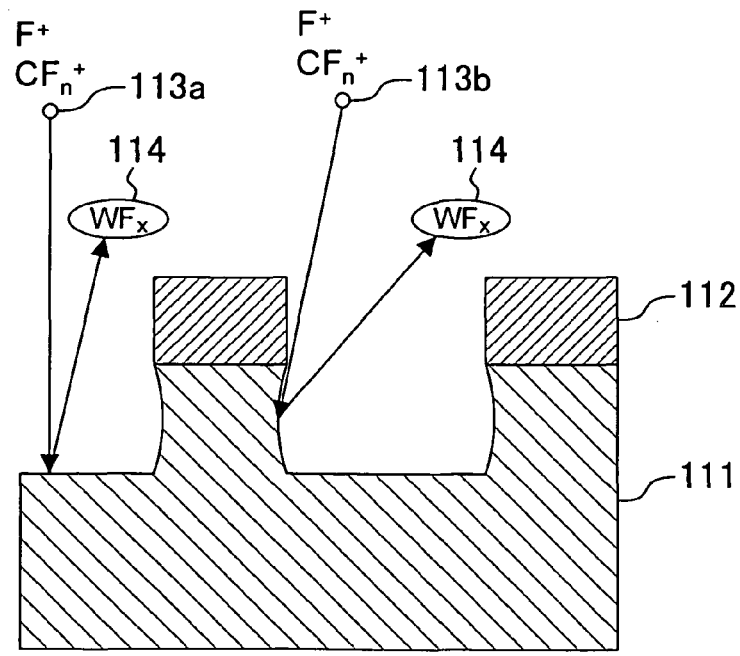
Figure 7A:
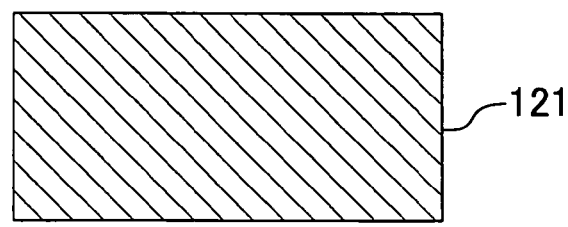
FIGS. 7A, 7B, 7C and 7D are cross-sectional views for showing procedures in a conventional fine structure formation method and a mold fabrication method by employing the same.
Figure 7B:
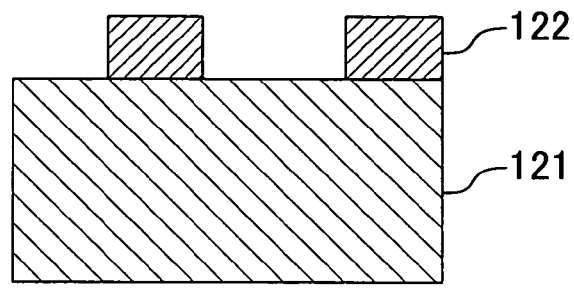
Figure 7C:
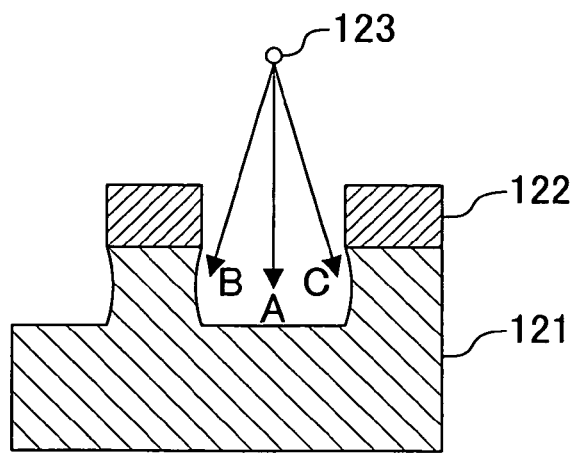
Figure 7D:
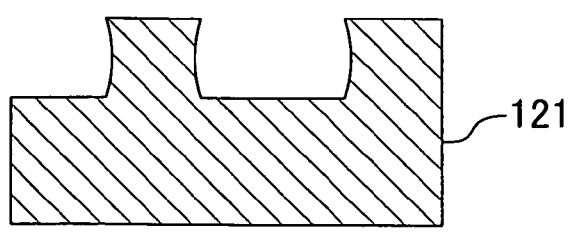

Since the mold of this embodiment is fabricated by dry etching the substance including tungsten and carbon by using plasma generated from a mixed gas at least of a gas including a fluorine atom, a gas including a nitrogen atom and a gas including a hydrocarbon molecule, the fine concavo-convex pattern is formed in a vertical cross-sectional shape free from a bowing shape as shown in FIGS. 5B through 5D or in a downward tapered cross-sectional shape as shown in FIGS. 5E through 5G.

Furthermore, as a characteristic the mold of this embodiment, a nitrogen content and a hydrocarbon content are higher in a portion closer to the etched face of the substance including tungsten and carbon (i.e., the substance 32).

The underlying substrate 31 of the mold may be a substrate 31a made of a metal or a conducting material (shown in FIG. 5B or 5E), a substrate 31b made of an insulating material (shown in FIG. 5C or 5F) or a substrate 31c made of a semiconductor material (shown in FIG. 5D or 5G), and the material for the substrate is selected in accordance with the use of the mold. For example, in the case where the mold is used with a current allowed to flow therethrough, the substrate 31a is selected as the underlying substrate 31. Alternatively, in the case where the mold is used with electrically insulated, the substrate 31b is selected as the underlying substrate 31.

In this embodiment, the gas including a fluorine atom used for fabricating the mold may be any of a fluorine molecule, fluorocarbon and fluorohydrocarbon or a mixture of two or more of them. For example, a gas of $F_2$, $CF_4$, $C_2F_6$, $C_3F_8$, $C_4F_6$, (cyclic or linear) $C_4F_8$, (cyclic or linear) $C_5F_8$, $CHF_3$, $CH_2F_2$, $CH_3F$ or the like, or a CF gas with a higher molecular weight for ecological use may be used. When such a gas is used, fluorine necessary for etching the tungsten (W) included in the substance including W and C is efficiently produced through the plasma discharge. Therefore, the substance including W and C can be more inexpensively etched into a highly precise vertical shape or a highly precise downward tapered shape. As a result, the mold having the fine concavo-convex pattern with highly precise vertical or highly precise downward tapered side faces can be more inexpensively provided.

Furthermore, in this embodiment, the gas including a nitrogen atom used for fabricating the mold may be a nitrogen molecule ($N_2$) or an ammonia molecule ($NH_3$), or a mixture thereof. When such a gas is used, the ion including a nitrogen atom can be efficiently produced through the plasma discharge, and hence, the carbon (C) included in the substance including W and C can be efficiently etched. Therefore, the mold having the fine concavo-convex pattern with a vertical cross-section or a downward tapered cross-section can be rapidly provided.

Moreover, as the hydrocarbon molecule used for fabricating the mold in this embodiment, a molecule of $C_{2i}H_{(2i+2)}$, $C_{2i}H_{(2i+1)}$, $C_{2i}H_{2i}$ or the like (wherein i is a natural number) is used. Also, the hydrocarbon molecule may be linear or cyclic. Furthermore, the hydrocarbon molecule is not limited to a molecule represented as above. Specifically, for example, any of $CH_4$, $C_2H_4$, $C_2H_6$, . . . , $C_4H_8$, etc. may be used. However, a saturated hydrocarbon molecule, $C_{2i}H_{(2i+2)}$, is practically preferably used. Since the saturated hydrocarbon molecule does not include a double bond, it can be easily decomposed through the plasma discharge, and $CH_r$ (wherein r=1 through 3) can be efficiently produced as a decomposition product. Accordingly, a protecting film for the pattern side face can be efficiently formed from the $CH_r$ during the etching. Also, since a small decomposition (dissociation) molecule such as $CH_r$ (wherein r=1 through 3) particularly has a small adsorption coefficient, it can enter the inside of a fine structure pattern with a high aspect ratio (a depth/width ratio). In particular, $CH_4$, that is, the smallest molecule among saturated hydrocarbon molecules, has the largest H/C ratio, and hence has the lowest deposition property among the saturated hydrocarbon molecules. This property is remarkable particularly when molecules not dissociated are compared. Therefore, for efficiently producing the $CH_r$ (wherein r=1 through 3) radical affecting the side face of a fine pattern, $CH_4$ is the easiest to handle and practically the most effective.

Furthermore, in this embodiment, the gas including a fluorine atom and the gas including a nitrogen atom may be replaced with a gas including a fluorine atom and a nitrogen atom ($NH_3$, $N_2F$ or the like). Alternatively, the gas including a fluorine atom and the gas including a hydrocarbon molecule may be replaced with a gas including a fluorine atom and a hydrocarbon molecule. Specifically, a gas of, for example, HFE-227me ($CF_3OCHFCF_3$), tetrafluorooxetane ($CF_2CF_2OCH_2$), hexafluoroisopropanol (($CF_3)_2CHOH$), HFE-245mf ($CF_2CH_2OCHF_2$), HFE-347mcf ($CHF_2OCH_2CF_2CF_3$), HFE-245mc ($CHF_3OCF_2CF_3$), HFE-347mf-c ($CF_3CH_2OCF_2CF_2H$), HFE-236me ($CHF_2OCH_2CHFCF_3$) or the like may be used. It is noted that these gases are gases with a small warming coefficient for use against the global warming and are friendly to the environment.

Moreover, in this embodiment, a gas including an oxygen atom may be further mixed with the mixed gas of the gas including a fluorine atom, the gas including a nitrogen atom and the gas including a hydrocarbon molecule. When any of an oxygen molecule, a nitrogen oxide molecule, a sulfur oxide molecule and a carbon oxide molecule or a mixture of two or more of them is used as the gas including an oxygen atom, oxygen can be efficiently supplied. When the gas including an oxygen atom is thus additionally used, oxygen radicals and the like can be efficiently produced through the plasma discharge, and hence, the carbon (C) included in the substance including W and C and a deposition such as an excessive portion of the sidewall protecting film can be appropriately removed and the etching rate of the substance can be increased. Accordingly, the mold having the fine concavo-convex pattern with a vertical cross-section or a downward tapered cross-section can be definitely provided. This is because an effect to remove the carbon in the form of $CO_2$ or CO is caused by an oxygen radical or an oxygen ion in addition to the aforementioned effect to remove the carbon. This effect is sufficiently caused even when the flow rate of the gas including an oxygen atom is less than 10% of the whole gas flow rate. Practically, the flow rate of the gas including an oxygen atom is set to a desired rate within a range of approximately 50% or less of the whole gas flow rate. It is noted that $O_2$, $CO_2$, CO, SO, $SO_2$, $SO_3$, $N_2O$, NO or $NO_2$ may be used as the gas including an oxygen atom.

Furthermore, in this embodiment, an inert gas may be further mixed with the mixed gas of the gas including a fluorine atom, the gas including a nitrogen atom and the gas including a hydrocarbon molecule. When an inert gas is mixed, the plasma discharge can be further stabilized due to the inert gas effect, and hence, what is called a process window can be easily increased, and the mold having the fine concavo-convex pattern with a vertical cross-section or a downward tapered cross-section can be stably provided.

Moreover, in this embodiment, the plasma is preferably generated with a gas including a hydrogen atom (such as a hydrogen molecule or an ammonia molecule) further mixed with the mixed gas of the gas including a fluorine atom, the gas including a nitrogen gas and the gas including a hydrocarbon molecule. In this manner, hydrogen produced from the plasma (specifically, a hydrogen atom, a hydrogen molecule, a hydrogen atom ion and a hydrogen molecule ion) can increase the etching efficiency for the carbon (C) included in the substance including W and C, and therefore, the mold having the fine concavo-convex pattern with a vertical cross-section or a downward tapered cross-section can be further rapidly provided.

Alternatively, in this embodiment, the plasma is preferably generated with at least one of a gas including a chlorine atom, a gas including a bromine atom and a gas including an iodine atom further mixed with the mixed gas of the gas including a fluorine atom, the gas including a nitrogen atom and the gas including a hydrocarbon molecule. In this manner, the side face protecting function for the etched portion caused by chlorine, bromine or iodine can be increased, and hence, a mold having a fine concavo-convex pattern with a downward tapered cross-section can be easily fabricated. As the gas including a chlorine atom, for example, $Cl_2$, HCl, $ClF_3$ or the like is used. Also, as the gas including a bromine atom, for example, $Br_2$, HBr or the like is used. As the gas including an iodine atom, $I_2$, HI or the like is used. Alternatively, a gas including a chlorine atom and at least one of a bromine atom and an iodine atom, such as ICl, $ClF_2Br$, $ClF_2I$ or BrCl, may be used. Further alternatively, a molecular gas including carbon, fluorine and halogen, such as $CF_xCl_{4-x}$, $CF_xBr_{4-x}$ or $CF_xI_{4-x}$ (wherein x=1 through 3), may be used. Also, a gas including a chlorine atom and a nitrogen atom (such as $NCl_3$), a gas including a bromine atom or an iodine atom and a nitrogen atom (such as $NBr_3$ or $NI_3$) or a gas including a chlorine atom and an oxygen atom (which may further include a bromine atom, an iodine atom or a nitrogen atom; such as $COCl_2$, $ClFO_3$, NOCl, $NO_2Cl$, $SOCl_2$, $SO_2Cl_2$ or $SO_3HCl$) may be used.

Moreover, in this embodiment, in the case where the gas including a chlorine atom, the gas including a bromine atom or the gas including an iodine atom is used, the mixing ratio of these gases is approximately 50% or less of the total gas flow rate. Specifically, when the gas including a chlorine atom, the gas including a bromine atom or the gas including an iodine atom is mixed in a ratio of 5% or more to the total gas flow rate of the gas used for generating the plasma, a sidewall protecting film can be easily formed in a comparatively large thickness owing to the mechanism for forming the sidewall protecting film. As a result, when the mixing ratio of the gas including a chlorine atom, the gas including a bromine atom or the gas including an iodine atom is adjusted in a range from several % to 50%, the tapered shape resulting from the etching can be freely changed.

In this manner, according to this embodiment, a mold having a highly precisely processed fine concavo-convex pattern can be inexpensively, easily and stably provided. Also, as the cross-sectional shape of the fine concavo-convex pattern, any shape ranging from a shape vertical to the substrate surface to a downward tapered shape (namely, a shape in which the upper base is longer than the lower base in the cross-section of each recess) can be freely formed.

Furthermore, the dimensional etching limit of the fine concavo-convex pattern obtained in the mold of this embodiment largely depends upon the lithography technique employed for forming the resist pattern, and currently, the substance can be etched by the minimum dimension of approximately 50 nm. Also, the mold of this embodiment can be used in various applications ranging from fabrication of an optical circuit component with a large processing dimension to nano-imprint where the minimum dimension is pursued. Moreover, since the mold of this embodiment has the etched cross-section in a vertical shape or a downward tapered shape free from bowing, a material onto which the concavo-convex pattern is transferred is not clogged up in recesses of the mold, and the mold can be easily peeled off after the transfer. Furthermore, in order to increase the use durability of the mold of this embodiment by more definitely preventing the clogging of the mold, the fine concavo-convex surface of the mold is subjected to a surface treatment with a metal, Teflon-coating, a silicon coupling agent or the like. The material used in such a surface treatment is arbitrarily selected in accordance with the material onto which the concavo-convex pattern is transferred by using the mold.

Although the substance including tungsten and carbon is used as the material of the surface portion of the mold in this embodiment, the same effects as those of this embodiment can be attained even when the substance further includes nitrogen. In other words, the same effects as those of this embodiment can be attained also when a WCN alloy or a WNC alloy is used.

What is claimed is:

1. A dry etching method comprising:
   placing a substance including tungsten and carbon in a reaction chamber;
   after placing the substrate, generating plasma from a mixed gas comprising a gas including fluorine, a gas including nitrogen and a gas consisting of at least one of $C_2H_4$, $C_2H_6$, $C_4H_8$ and a saturated hydrocarbon molecule;
   dry etching the substance by using the plasma; and
   wherein said saturated hydrocarbon molecule has carbon-carbon single bond, and consists of hydrogen and carbon.

2. The dry etching method of claim 1,
   wherein said gas including fluorine and said gas including nitrogen are replaced with a gas including fluorine and nitrogen.

3. The dry etching method of claim 1,
   wherein said gas including fluorine includes a fluorine molecule, fluorocarbon, fluorohydrocarbon or a mixture of two or more thereof.

4. The dry etching method of claim 1,
   wherein said gas including nitrogen includes a nitrogen molecule, an ammonia molecule or a mixture thereof.

5. The dry etching method of claim 1,
   wherein said mixed gas further includes a hydrogen molecule or an ammonia molecule.

6. The dry etching method of claim 1,
   wherein said mixed gas further includes a gas including oxygen.

7. The dry etching method of claim 1,
   wherein said mixed gas further includes an inert gas.

8. The dry etching method of claim 1,
   wherein said mixed gas further includes at least one of a gas including chlorine, a gas including bromine and a gas including iodine.

9. The dry etching method of claim 1,
   wherein said substance including tungsten and carbon is an alloy including tungsten and carbon.

10. The dry etching method of claim 9,
    wherein said alloy including tungsten and carbon further includes nitrogen.

11. The dry etching method of claim 1,
    wherein said substance including tungsten and carbon is a tungsten-carbon alloy substrate or a substrate having a tungsten-carbon alloy in a surface portion thereof.

12. A fine structure formation method comprising:
    forming a mask pattern on a substance including tungsten and carbon; and
    with said mask pattern used as an etching mask, dry etching said substance by using plasma generated from a mixed gas comprising a gas including fluorine, a gas including nitrogen and a gas consisting of at least one of $C_2H_4$, $C_2H_6$, $C_4H_8$ and a saturated hydrocarbon molecule
    wherein said saturated hydrocarbon molecule has carbon-carbon single bond, and consists of hydrogen and carbon.

13. The fine structure formation method of claim 12,
    wherein said gas including fluorine and said gas including nitrogen are replaced with a gas including fluorine and nitrogen.

14. The fine structure formation method of claim 12,
    wherein said gas including fluorine includes a fluorine molecule, fluorocarbon, fluorohydrocarbon or a mixture of two or more thereof.

15. The fine structure formation method of claim 12,
    wherein said gas including nitrogen includes a nitrogen molecule, an ammonia molecule or a mixture thereof.

16. The fine structure formation method of claim 12,
    wherein said mixed gas further includes a hydrogen molecule or an ammonia molecule.

17. The fine structure formation method of claim 12,
    wherein said mixed gas further includes a gas including oxygen.

18. The fine structure formation method of claim 12,
    wherein said mixed gas further includes an inert gas.

19. The fine structure formation method of claim 12,
    wherein said mixed gas further includes at least one of a gas including chlorine, a gas including bromine and a gas including iodine.

20. A mold fabrication method comprising:
    placing a substance including tungsten and carbon in a reaction chamber;
    after placing the substrate, generating plasma from a mixed gas comprising a gas including fluorine, a gas including nitrogen and a gas consisting of at least one of $C_2H_4$, $C_2H_6$, $C_4H_8$ and a saturated hydrocarbon molecule;
    dry etching the substance by using the plasma to process said substance into a mold; and wherein said saturated hydrocarbon molecule has carbon-carbon single bond, and consists of hydrogen and carbon.

21. The mold fabrication method of claim 20, wherein said gas including fluorine and said gas including nitrogen are replaced with a gas including fluorine and nitrogen.

22. The mold fabrication method of claim 20, wherein said gas including fluorine includes a fluorine molecule, fluorocarbon, fluorohydrocarbon or a mixture of two or more thereof.

23. The mold fabrication method of claim 20, wherein said gas including nitrogen includes a nitrogen molecule, an ammonia molecule or a mixture thereof.

24. The mold fabrication method of claim 20, wherein said mixed gas further includes a hydrogen molecule or an ammonia molecule.

25. The mold fabrication method of claim 20, wherein said mixed gas further includes a gas including oxygen.

26. The mold fabrication method of claim 20, wherein said mixed gas further includes an inert gas.

27. The mold fabrication method of claim 20, wherein said mixed gas further includes at least one of a gas including chlorine, a gas including bromine and a gas including iodine.

* * * * *